United States Patent
Nordstrand et al.

(10) Patent No.: US 11,004,104 B2
(45) Date of Patent: **\*May 11, 2021**

(54) DUAL REDEMPTION PATH WITH SHARED BENEFITS SYSTEM AND METHOD

(71) Applicant: Solutran, Inc., Minneapolis, MN (US)

(72) Inventors: Barry J. Nordstrand, Excelsior, MN (US); Jason Lynn Prigge, Maple Grove, MN (US); James Joseph Smola, Hanover, MN (US)

(73) Assignee: Solutran, Inc., Minneapolis, MN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/746,883

(22) Filed: Jan. 19, 2020

(65) Prior Publication Data

US 2020/0151754 A1 May 14, 2020

Related U.S. Application Data

(63) Continuation of application No. 15/008,787, filed on Jan. 28, 2016, now Pat. No. 10,552,861, which is a
(Continued)

(51) Int. Cl.
*G06Q 30/02* (2012.01)
*G06Q 20/20* (2012.01)

(52) U.S. Cl.
CPC ....... *G06Q 30/0238* (2013.01); *G06Q 20/208* (2013.01); *G06Q 30/0219* (2013.01); *G06Q 30/0222* (2013.01)

(58) Field of Classification Search
CPC ............. G06Q 30/0238; G06Q 20/208; G06Q 30/0222; G06Q 30/0219
See application file for complete search history.

(56) References Cited

U.S. PATENT DOCUMENTS

| | | | |
|---|---|---|---|
| 3,947,660 A | \* | 3/1976 | Saito .................. G06K 7/10 235/383 |
| 6,684,195 B1 | | 1/2004 | Deaton et al. |

(Continued)

FOREIGN PATENT DOCUMENTS

WO WO2009145336 12/2009

OTHER PUBLICATIONS

Closed Loop Retail Business Process for Targeted Offers, IP.com No. IPCOM000153072D, Original Publication Date: May 23, 2007.\*

(Continued)

*Primary Examiner* — David J Stoltenberg
(74) *Attorney, Agent, or Firm* — Forsgren Fisher; Daniel Tysver; James Urzedowski

(57) ABSTRACT

A system and method is presented for product substantiation and promotion redemption. A purchased product list is transmitted from a retail store system to a promotion analysis server along with a user identifier. The promotion analysis server identifies promotions available to the user, and then considers whether the benefits under the promotions are still available to the user. Discounts for available promotions related to the purchased product list are calculated and transmitted to the retail store system for deduction from the transactions. A promotion product filter can be provided that filters the purchased product list before transmittal. The promotion product filter can include promotions from a plurality of programs. SNAP and Enhanced SNAP benefits can be provided along with the discount benefits.

20 Claims, 20 Drawing Sheets

Related U.S. Application Data continuation-in-part of application No. 14/262,149, filed on Apr. 25, 2014, now abandoned, which is a continuation-in-part of application No. 13/835,372, filed on Mar. 15, 2013, now abandoned.

(60) Provisional application No. 61/763,462, filed on Feb. 11, 2013.

(56) References Cited

U.S. PATENT DOCUMENTS

| | | |
|---|---|---|
| 6,937,995 B1 | 8/2005 | Kepecs |
| 7,111,780 B2 | 9/2006 | Broussard et al. |
| 7,877,289 B1 | 1/2011 | Cunningham et al. |
| 7,904,333 B1 | 3/2011 | Perkowski |
| 8,321,302 B2 | 11/2012 | Bauer et al. |
| 8,498,898 B1 | 7/2013 | Kogen et al. |
| 2002/0040321 A1 | 4/2002 | Nicholson |
| 2002/0046116 A1 | 4/2002 | Hohle et al. |
| 2002/0049631 A1 | 4/2002 | Williams |
| 2002/0100808 A1 | 8/2002 | Norwood et al. |
| 2003/0212595 A1* | 11/2003 | Antonucci ......... G06Q 30/0235 705/14.27 |
| 2003/0216967 A1 | 11/2003 | Williams |
| 2004/0054590 A1 | 3/2004 | Redford et al. |
| 2004/0140361 A1 | 7/2004 | Paul |
| 2005/0071222 A1 | 3/2005 | Bigus et al. |
| 2005/0071225 A1 | 3/2005 | Bortolin et al. |
| 2005/0261968 A1 | 11/2005 | Randall et al. |
| 2005/0278216 A1 | 12/2005 | Graves |
| 2006/0015402 A1 | 1/2006 | Graves et al. |
| 2006/0053056 A1 | 3/2006 | Alspach-goss et al. |
| 2006/0074784 A1 | 4/2006 | Brown |
| 2006/0095328 A1 | 5/2006 | Ross et al. |
| 2006/0113374 A1 | 6/2006 | Taylor et al. |
| 2006/0113376 A1 | 6/2006 | Reed et al. |
| 2006/0122855 A1 | 6/2006 | Prorock |
| 2006/0206435 A1 | 9/2006 | Hoblit et al. |
| 2007/0011044 A1 | 1/2007 | Hansen |
| 2007/0156531 A1 | 7/2007 | Schuller et al. |
| 2007/0164106 A1 | 7/2007 | Mcdevitt et al. |
| 2007/0175985 A1 | 8/2007 | Barnes et al. |
| 2007/0185803 A1 | 8/2007 | Harrison et al. |
| 2007/0244745 A1 | 10/2007 | Boal |
| 2007/0244811 A1 | 10/2007 | Tumminaro |
| 2008/0033880 A1 | 2/2008 | Fiebiger et al. |
| 2008/0059306 A1 | 3/2008 | Fordyce et al. |
| 2008/0077498 A1* | 3/2008 | Ariff ................. G06Q 20/208 705/14.27 |
| 2008/0097844 A1 | 4/2008 | Hsu et al. |
| 2008/0210753 A1 | 9/2008 | Plozay et al. |
| 2009/0018860 A1 | 1/2009 | Sikes et al. |
| 2009/0070251 A1* | 3/2009 | Gonen ............... G06Q 30/0207 705/37 |
| 2009/0099929 A1 | 4/2009 | Thibedeau et al. |
| 2009/0150234 A1 | 6/2009 | Darst et al. |
| 2009/0259589 A1 | 10/2009 | Agostino et al. |
| 2010/0010901 A1 | 1/2010 | Marshall et al. |
| 2010/0057554 A1 | 3/2010 | Lanford |
| 2010/0057611 A1 | 3/2010 | Antoo et al. |
| 2010/0094733 A1 | 4/2010 | Shapira et al. |
| 2010/0100484 A1 | 4/2010 | Nguyen et al. |
| 2010/0274659 A1* | 10/2010 | Antonucci ......... G06Q 30/0268 705/14.33 |
| 2011/0015980 A1 | 1/2011 | Li |
| 2011/0078011 A1* | 3/2011 | Senghore .......... G06Q 30/0219 705/14.25 |
| 2011/0087592 A1 | 4/2011 | Van Der Veen et al. |
| 2011/0288918 A1* | 11/2011 | Cervenka ............. G06Q 20/40 705/14.17 |
| 2011/0302020 A1* | 12/2011 | Ariff ................... B01J 23/6562 705/14.28 |
| 2012/0012648 A1 | 1/2012 | Collins et al. |
| 2012/0016730 A1* | 1/2012 | Antonucci ......... B01J 23/8913 705/14.28 |
| 2012/0030002 A1* | 2/2012 | Bous ................. G06Q 30/0236 705/14.36 |
| 2012/0066049 A1 | 3/2012 | Muthugopalakrishnan et al. |
| 2012/0136706 A1* | 5/2012 | Chang ................ G06Q 30/0219 705/14.21 |
| 2012/0150553 A1 | 6/2012 | Wade |
| 2012/0150668 A1 | 6/2012 | Wade |
| 2012/0150694 A1 | 6/2012 | Wade |
| 2012/0150697 A1 | 6/2012 | Wade |
| 2012/0150746 A1 | 6/2012 | Graham |
| 2012/0221468 A1 | 8/2012 | Kumnick et al. |
| 2012/0226534 A1* | 9/2012 | Aloni ................. G06Q 30/0226 705/14.17 |
| 2012/0310722 A1* | 12/2012 | Baron ................ G06Q 30/0237 705/14.26 |
| 2013/0103473 A1* | 4/2013 | Carpenter .......... G06Q 30/0249 705/14.17 |
| 2013/0262249 A1 | 10/2013 | Beyer et al. |
| 2013/0338167 A1 | 12/2013 | Cai et al. |
| 2013/0339167 A1 | 12/2013 | Taylor et al. |
| 2013/0339238 A1 | 12/2013 | Unland et al. |
| 2014/0006126 A1 | 1/2014 | Mysen |
| 2014/0188644 A1 | 7/2014 | Postrel |
| 2014/0214567 A1 | 7/2014 | Llach et al. |
| 2015/0120418 A1 | 4/2015 | Cervenka et al. |

OTHER PUBLICATIONS

Nov. 20, 2013 USPTO Office Action (U.S. Appl. No. 13/446,743).
Texas Department of Health, Specification for Integrated WIC EBT Grocer Systems, Version 1.5, Apr. 9, 2004.
WIC Program, Food and Nutrition Service, EBT "One-Card" Technical and Programmatic Considerations, May 10, 2011.
Medagate Corp., Innovations in Consumer-Driver Healthcare, Flexible Payment and Incentive Solutions Driving Healthcare Consumerism, Jan. 2013.
Sam's Club, eValues Brochure.
Sam's Club, eValues screen shot of Webpage.
American National Standard for Financial Services, X9.93—2013, Financial Transaction Messages—Electronic Benefits Transfer (EBT)—Part 1: Messages.
American National Standard for Financial Services, X9.93-2:2008, Financial Transaction Messages—Electronic Benefits Transfer (EBT)—Part 2: Files.
American National Standard for Financial Services, ANS X9.93—2008, Financial Transaction Messages—Electronic Benefits Transfer (EBT)—Part 1: Messages.
USDA, Food and Nutrition Service, WIC EBT, Technical Implementation Guide, 2012 Version, Sep. 30, 2012.
USDA, Food and Nutrition, WIC EBT Operating Rules, 2010.
WIC, Universal MIS-EBT Interface, Version 1.6, Nov. 23, 2010.
USDA, Food and Nutrition Service, Electronic Benefits Transfer (EBT) Systems Testing Guidelines for the Special Supplemental Nutrition Program for Women, Infants, and Children (WIC), Final, Jun. 2002.
USDA, Food and Nutrition Services, Functional Requirements Document for a Model WIC Information System, Version 2008 2.0, Sep. 2008.
Jul. 11, 2014 USPTO Office Action (U.S. Appl. No. 14/173,385).
Sep. 11, 2014 USPTO Office Action (U.S. Appl. No. 14/262,344).
Oct. 2, 2014 USPTO Office Action (U.S. Appl. No. 14/262,149).
Oct. 14, 2014 USPTO Office Action (U.S. Appl. No. 14/173,360).
Dec. 11, 2014 USPTO Office Action (U.S. Appl. No. 14/173,385).
Jul. 8, 2015 USPTO Office Action (U.S. Appl. No. 14/262,344).
Aug. 19, 2015 USPTO Office Action (U.S. Appl. No. 14/262,149).
Jan. 13, 2016 USPTO Office Action (U.S. Appl. No. 13/835,372).
Aug. 16, 2016 USPTO Office Action (U.S. Appl. No. 14/173,385).
Jun. 2, 2017 USPTO Office Action (U.S. Appl. No. 14/173,385).
Aug. 28, 2017 USPTO Office Action (U.S. Appl. No. 14/262,149).
Dec. 14, 2017 USPTO Office Action (U.S. Appl. No. 15/008,787).
Dec. 14, 2017 USPTO Office Action (U.S. Appl. No. 15/726,455).
Feb. 16, 2018 USPTO Office Action (U.S. Appl. No. 14/715,264).
Mar. 9, 2018 USPTO Office Action (U.S. Appl. No. 14/262,149).
Feb. 6, 2019 USPTO Office Action (U.S. Appl. No. 14/939,158).

(56) References Cited

OTHER PUBLICATIONS

Mar. 4, 2019 USPTO Office Action (U.S. Appl. No. 15/008,787).
Aug. 8, 2019 USPTO Office Action (U.S. Appl. No. 15/834,176).

* cited by examiner

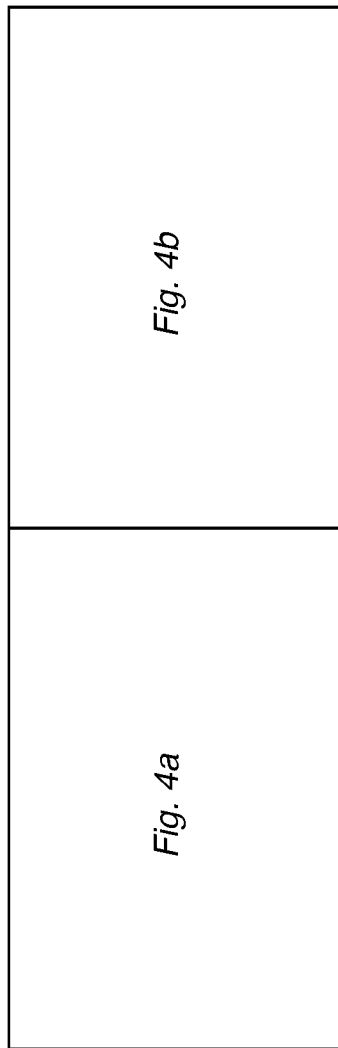

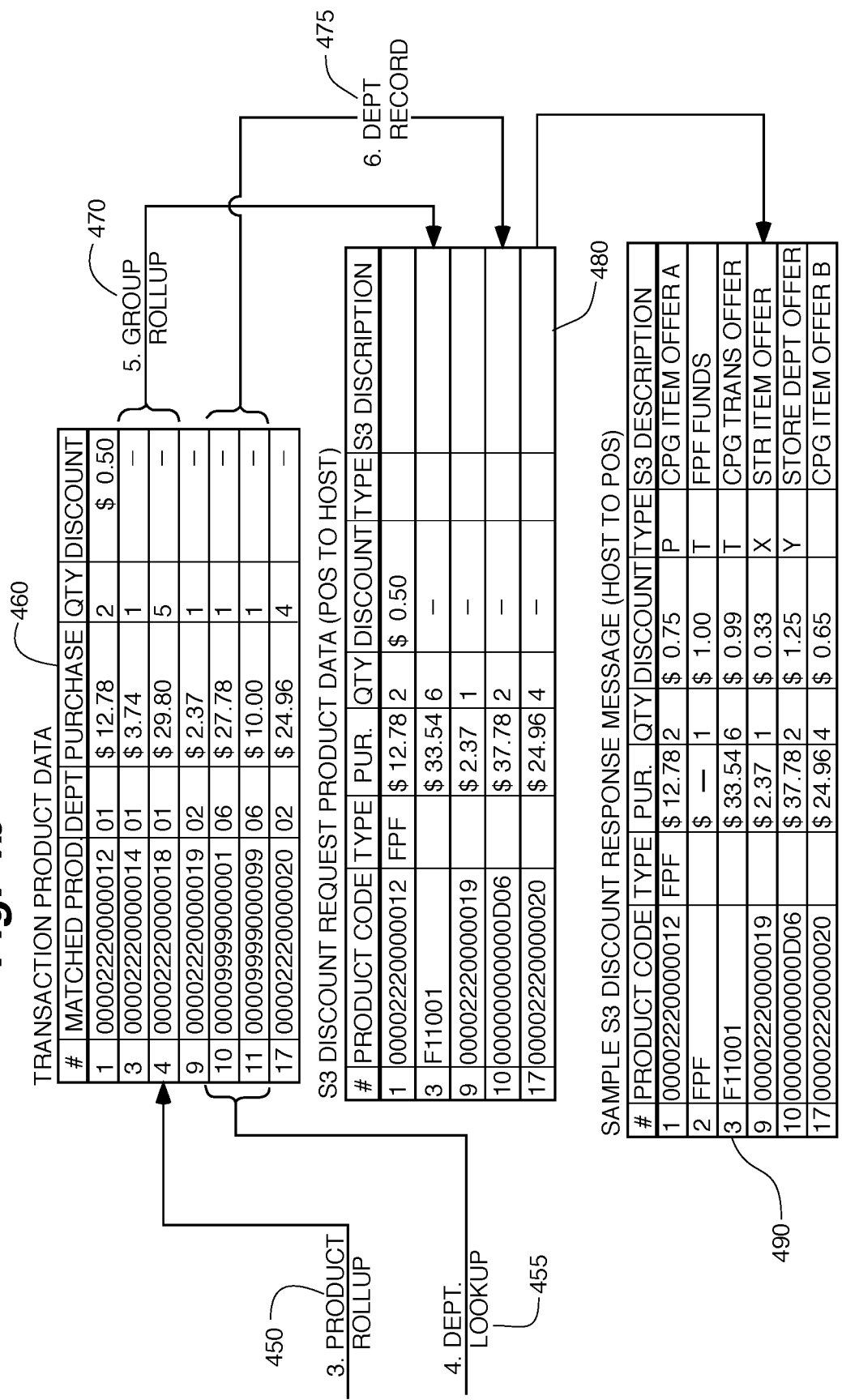

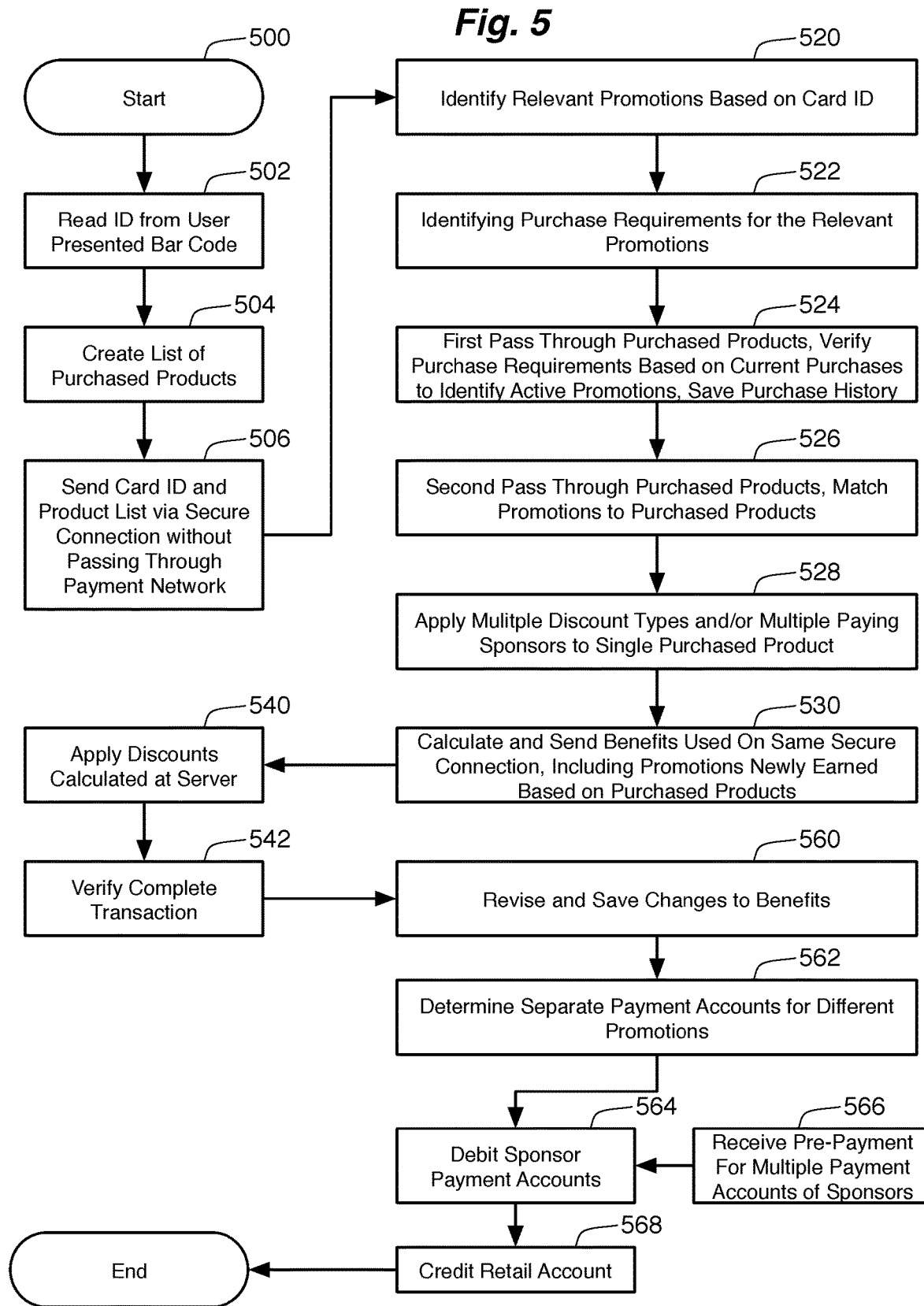

Fig. 7
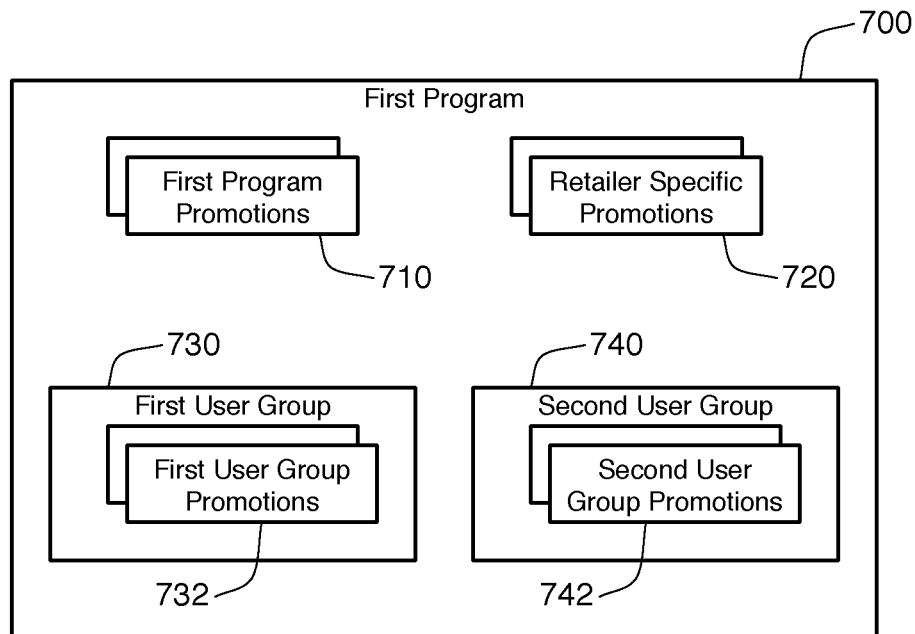
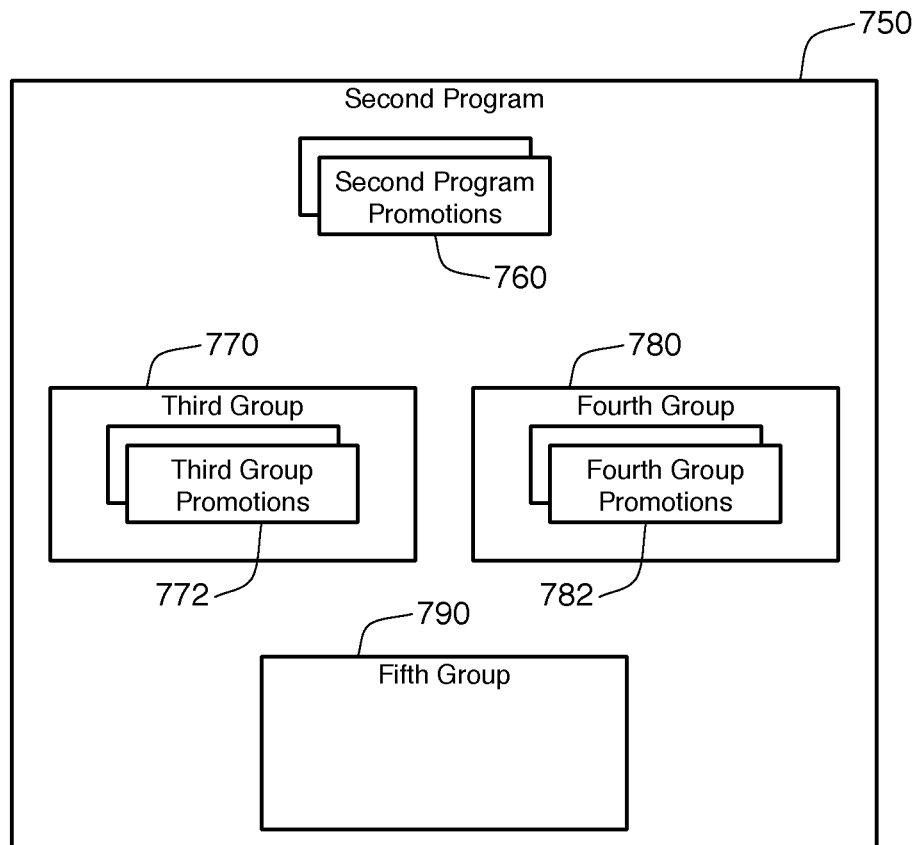

Fig. 11

| # | Scenario | Discount Type | Variation | Value | Level | NTE | PR Type | Value | Duration | Benefit | Value | Duration | Primary | Secondary |
|---|---|---|---|---|---|---|---|---|---|---|---|---|---|---|
| 1 | Save $1 on This | Cents Off | 1-for-1 | $1.00 | Promotion | null | Units | 1 | Transaction | Units | 1 | Transaction | This | null |
| 2 | 25 Cent Discount on This - limit 3 | Cents Off | Multiples | $0.25 | Promotion | null | Units | 1 | Transaction | Units | 3 | Transaction | This | null |
| 3 | Buy This x3 - Save 75 Cents | Cents Off | Conditional | $0.75 | Promotion | null | Units | 3 | Transaction | Units | 1 | Transaction | This | null |
| 4 | Buy This to Save $1 on That | Cents Off | Crossover | $1.00 | Promotion | null | Units | 1 | Transaction | Units | 1 | Transaction | This | That |
| 5 | Spend $10 on This Save $1 | Cents Off | Conditional | $1.00 | Promotion | null | Dollars | $10.00 | Transaction | Units | 1 | Transaction | This | null |
| 6 | $20 Cash Value to Spend on These | Percent Off | Multiples | 100% | Promotion | null | Units | 1 | Transaction | Dollars | $20.00 | Transaction | These | null |
| 7 | 10% Discount (max $1) | Percent Off | 1-for-1 | 10% | Promotion | $1.00 | Units | 1 | Transaction | Units | 1 | Transaction | This | null |
| 8 | 10% Discount up to 3 items (max $3) | Percent Off | Multiples | 10% | Promotion | $1.00 | Units | 1 | Transaction | Units | 3 | Transaction | This | null |
| 9 | Free Item up to $20 | Percent Off | 1-for-1 | 100% | Promotion | $20.00 | Units | 1 | Transaction | Units | 1 | Transaction | This | null |
| 10 | BOGO up to $5 | Percent Off | Conditional | 100% | Promotion | $5.00 | Units | 2 | Transaction | Units | 1 | Transaction | This | null |
| 11 | Double BOGO - Limit 2 | Percent Off | Conditional | 100% | Promotion | $5.00 | Units | 2 | Transaction | Units | 2 | Transaction | These | null |
| 12 | Buy This - Get That Free up to $5 | Percent Off | Crossover | 100% | Promotion | $5.00 | Units | 1 | Transaction | Units | 1 | Transaction | This | That |
| 13 | 25% Off FFV up to $20/week | Percent Off | Conditional | 25% | Promotion | null | Units | 1 | Transaction | Dollars | $20.00 | Period | These | null |
| 14 | Spend $100 on These - Get That Free ($5) | Percent Off | Conditional | 100% | Promotion | $5.00 | Dollars | $100.00 | Transaction | Units | 1 | Transaction | These | That |
| 15 | $20 Prescription for $20 (max $10) | Percent Off | Copay | 100% | Promotion | $10.00 | Dollars | $20.00 | Transaction | Units | 1 | Transaction | This | null |

1100

DUAL REDEMPTION PATH WITH SHARED BENEFITS SYSTEM AND METHOD

RELATED APPLICATION

This application is a continuation of U.S. patent application Ser. No. 15/008,787, filed Jan. 28, 2016, which is a continuation-in-part of U.S. patent application Ser. No. 14/262,149, filed Apr. 25, 2014, which is a continuation-in-part of U.S. patent application Ser. No. 13/835,372, filed Mar. 15, 2013, which in turn claimed the benefit of Provisional Application No. 61/763,462, filed Feb. 11, 2013, all of which are hereby incorporated by reference in their entireties.

FIELD OF INVENTION

The present application relates to the field of product promotions. More particularly, the described embodiments relate to a system and method for substantiated product purchases made during promotion redemption using a remote server and a promotion product filter.

BRIEF DESCRIPTION OF THE DRAWINGS

FIG. 5 is a flow chart showing a method to perform an embodiment of the present invention.

FIG. 7 is a schematic diagram showing the relationship between multiple programs, groups, and promotions.

FIG. 11 is a table showing the components of one embodiment of a promotion.

DETAILED DESCRIPTION

Figure 1:
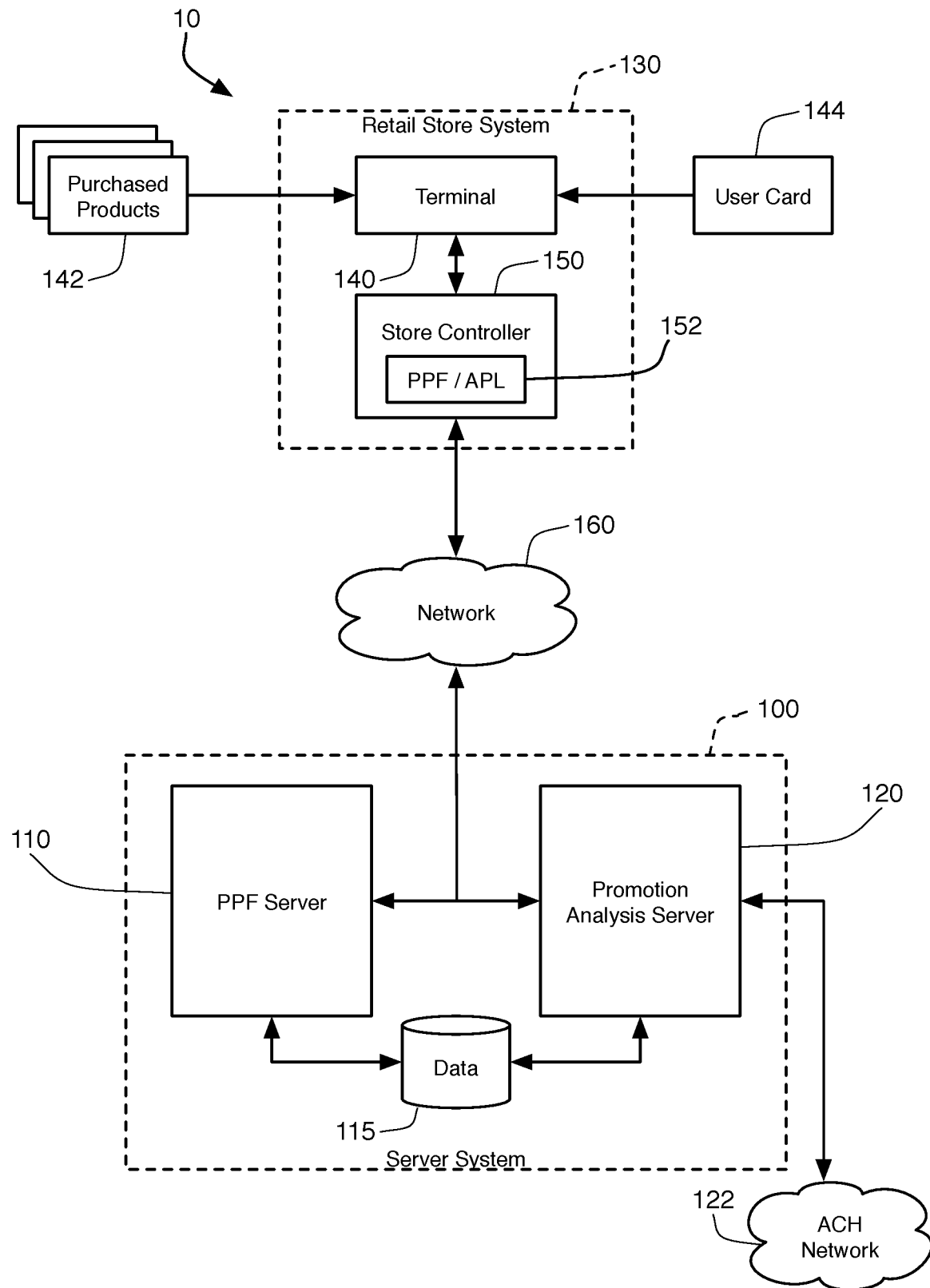
FIG. 1 is a system diagram showing the primary components of one embodiment of the present invention.

FIG. 1: System Configuration and Overview

FIG. 1 shows a promotion management system 10 in which a server system 100 communicates with a retail store system 130 over a network 160. The server system 100 is shown consisting of a promotion product filter (or "PPF") server 110 and a promotion analysis server 120, each of which may take the form of one or more computer systems. Similarly, the retail store system 130 traditionally takes the form at least one store terminal 140 and a store controller 150. The terminal 140 may be a point of sale or electronic cash register (POS/ECR) computer system that processes products or other items 142 provided for purchase by a consumer. In some embodiments, the terminal 140 is embodied in a tablet computer, which may or may not have the ability to read credit cards and open a cash drawer. The store controller 150 communicates with each of the terminals 140 within a retail store environment, and may also be responsible for managing external communication such as over network 160. In other embodiments, the terminal 140 and store controller 150 are incorporated into a single device. This single device is effectively a POS/ECR machine (which may itself be a tablet computer) that also takes on the role of a store controller 150 in the embodiments described below. Other embodiments utilize the fact that the store controller 150 operates separately from the terminal devices 140 in order to minimize workload on terminal devices 140 and maximize the overall efficiency of the retail store system 130.

In the system 10, the PPF server 110 is responsible for developing a list of products for which active promotions are being managed by the server system 100. This list, known as promotion product filter (PPF) list, is preferably created with help of a database 115 and is used for filtering purposes at the retail store system 130. In the parent applications, the PPF was referred to as an approved product list (or APL). The PPF is transmitted from the PPF server 110 to the retail store system 130 over the network 160 and saved as 152. A user presents their selected products 142 for purchase at the terminal 140, and also presents a user card 144. Based on an identifier on the user card 144, the retail store system 130 (in either the terminal 140 or the store controller 150) determines which products in the PPF 152 are relevant for the consumer presenting the card 144. The products 142 presented for purchase are then compared against this portion of the PPF 152 to create a filtered list of products being purchased that are potentially eligible for discounts. This list is then sent by the retail store system 130 along with a user identifier (such as a card ID found on the user card 144) to the promotion analysis server 120.

The promotion analysis server 120 then examines the database 115 to determine which promotions still have benefits that are available for that identified user. If benefits remain for the products purchased 142, the promotional analysis server will apply the applicable promotions to the filtered product list sent from the retail store system 130. These promotions may have purchase requirements or benefit caps attached to them. For instance, one promotion may limit the user to two discounts for any single purchase transaction, while another promotion may have a requirement that the consumer purchase a first product before a discount will be applied to a second product. The promotion analysis server 120 ensures that these requirements have been met for the applicable promotions, and then calculates the available discounts based on the promotions. The calculated discounts are used to update the available benefits in the database 115, and are then transmitted over the network 160 to the retail store system 130. The terminal 140 will then apply the calculated discounts to the purchase price of the products 142. The server system 100 then uses the discount calculated to debit accounts owned by the sponsors of the promotions, and credit the account of the retailer that owns the retail store system 130. In one embodiment, either or both of the credit and debit transactions can take place over the ACH network 122 accessed by the server system 100. Note that the actions of the PPF server 110 and the promotion analysis server 120 need not be performed on physically distinct computer systems.

Figure 2:
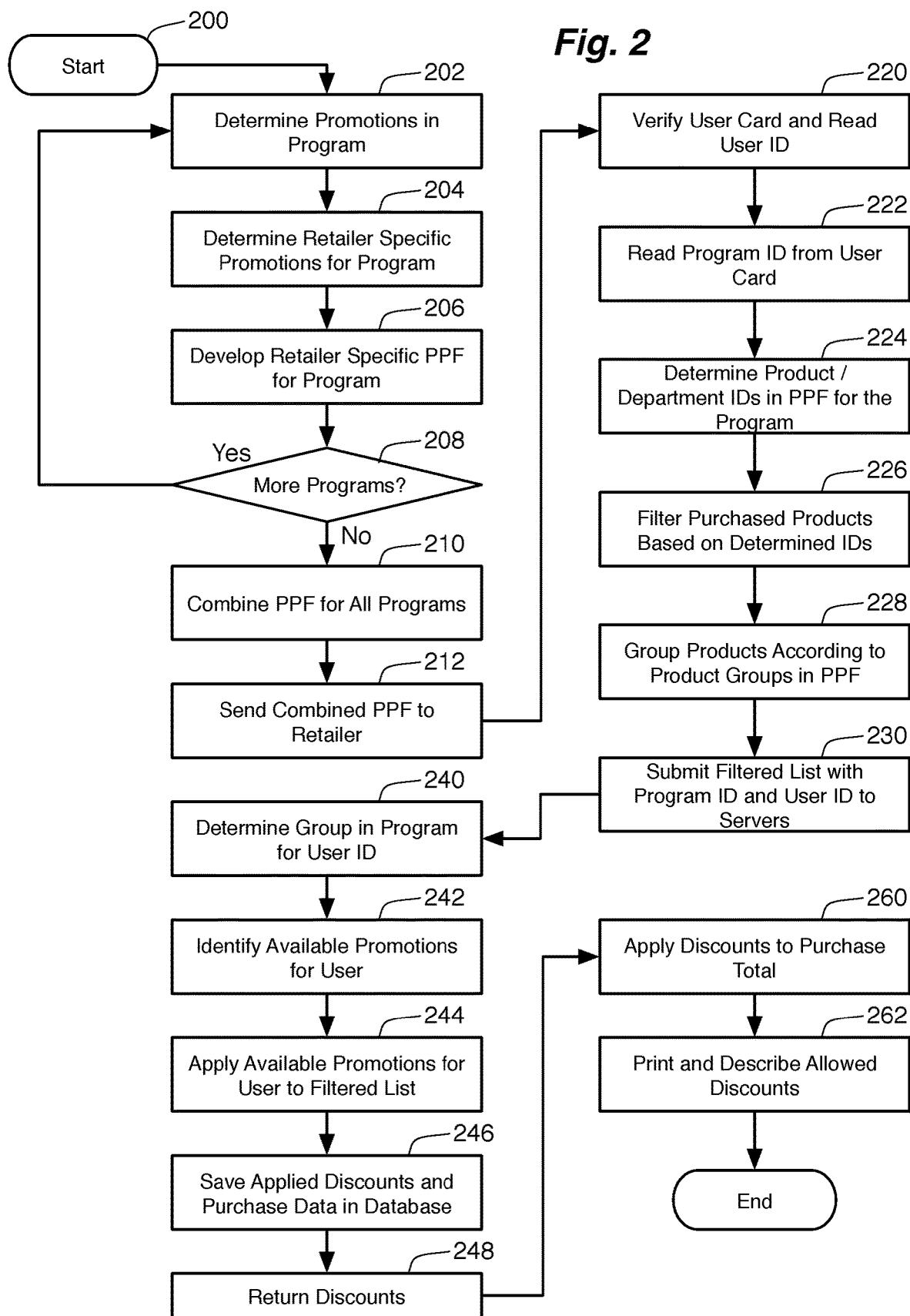
FIG. 2 is a flow chart showing a method to perform one embodiment of the present invention.

FIG. 2: Overall Method, and FIGS. 11 and 12: Promotions

Figure 12:
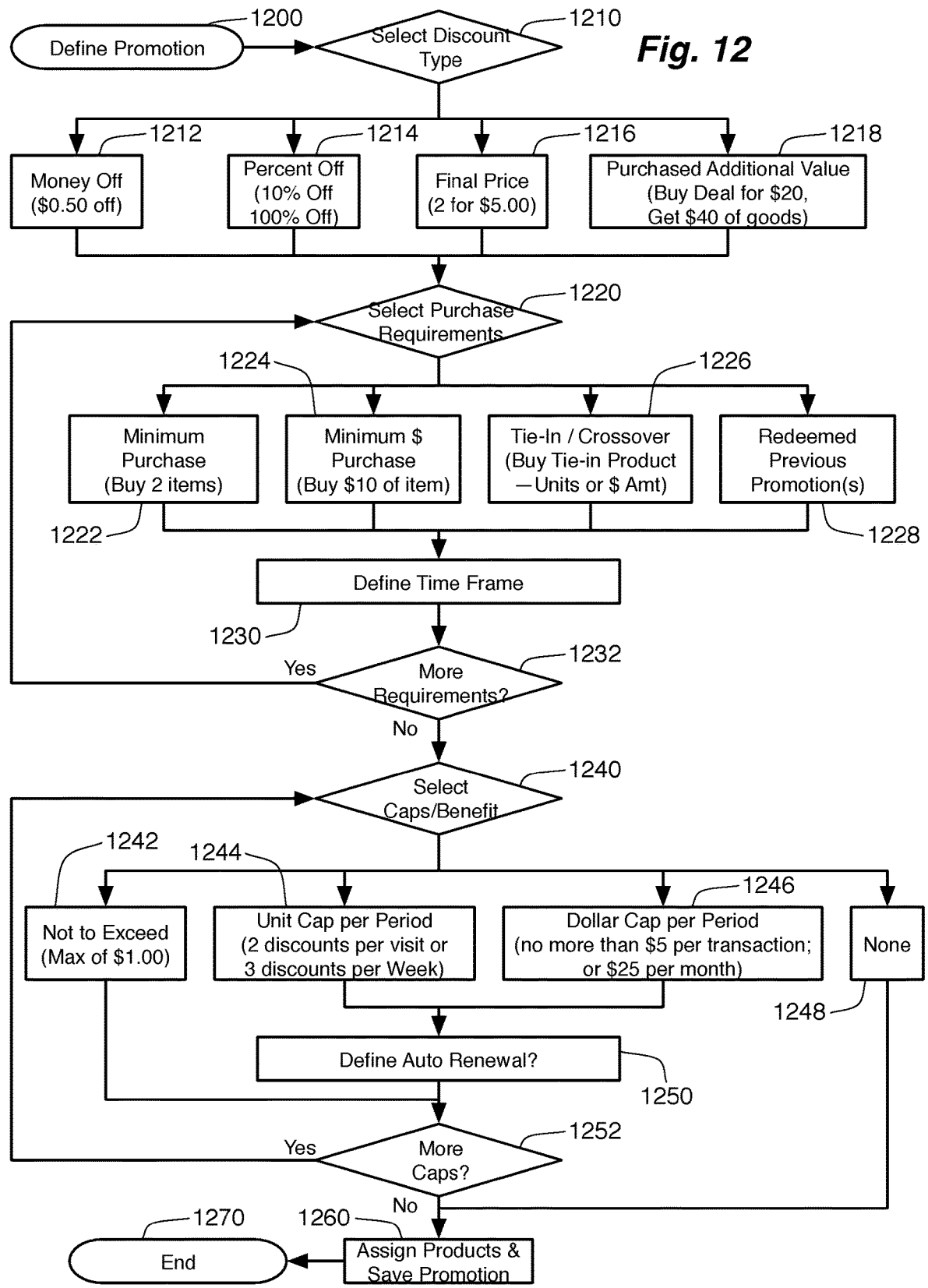
FIG. 12 is a flow chart showing the selection of discount type, purchase restrictions, and caps that define a promotion.

FIG. 2 shows a method 200 that can be used to manage promotions and programs using system 10. A promotion generally takes the form of a discount on an item. Some example promotions that can be supported by the system 10 include:

1) a money-off discount, such as $1.00 off a particular product;
2) a percentage-off discount, such as 20% off of any product sold under a common brand;
3) a final price discount where the discount provides the final price to be paid (2 items for $5.00, or $1.99 per pound) as opposed to a specified percentage or money-off discount;
4) a stored value benefit for a particular category or product group, such as $10 per month to spend on over-the-counter drugs;
5) a buy one get one free promotion for a product; and
6) a tie-in where a discount is applied to second product only after the user has purchased a first product;
7) a promotion with a cap on the number of discounts provided under the promotion in the current transaction, such as no more than two discounts per transaction;
8) a promotion that caps on the number of discounts provided under the promotion in a given time period, such as no more than four discounts per week;
9) a promotion with a cap on the dollar value of the discount for a time period, such as no more than $25 of discounts for the promotion per month; and
10) a promotion with a minimum purchase requirement, such as 10% off any $10 or more purchase of a product The possible variations on discount types, purchase requirements, and caps are described in more detail in connection with FIGS. 11 and 12 below.

A program is a set of promotions provided to users. For example, an employer may encourage employees to eat more healthily by creating a program with a variety of promotions on healthy foods. The employer can fund some of these promotions, and then seek partners to pay for others of the promotions in the program (or the administrator of the system 100 could assist in finding partners). A health food brand may agree to pay for a 5% discount on all of their products, while a vitamin brand may agree to provide $1 off any purchase of at least $10 of their vitamins. The employer would provide a card for this promotion to their employees that they can use at a variety of retail stores. While the card is accepted and redeemable at many different retailers, the employer may be able to convince one or more of the retailers to add their own promotion to the program. For instance, a first retailer may agree to provide an additional 5% off of fruits and vegetables, while a second retailer may agree to a $5 discount off of any purchase made from their organic food department that exceeds $50. A third retailer may refuse to provide any additional discounts, but still agree to accept the card for promotions paid for by other parties. One of the primary benefits of defining a program in this way is that the program need not be static, as changes made to the promotions that constitute a program are easily communicated through the entire system 10. The means that the employer could change, add, or remove promotions within their program with very little effort. A fuller description of programs is provided below in connection with FIG. 7.

Promotion product filters are generated on a retailer-by-retailer basis. This means that in order to generate a PPF in method 200, the PPF server 110 must identify all of the general promotions that make up a program in step 202, and then identify in step 204 any retailer-specific promotions that the retailer receiving this PPF has agreed to add to the program. Once all the general and retailer-specific promotions are identified for a program, the PPF server 110 will generate a list of products that are covered by these promotions. The product list will include the products that are being discounted by these promotions, as well as tie-in products that may need to be purchased before a tie-in promotion is available for redemption. This list of products is the promotion product filter for that program, and is created in step 206. In the preferred embodiment, the server system 100 can handle a plurality of programs created by a plurality of program sponsors. If additional promotion product filters need to be created for additional programs, as determined by step 208, the method returns to step 202 for the next program. If the lists of products for all relevant programs have been created, then these lists are combined in step 210 into a single PPF and sent to the retailer store system 130 in step 212. Because this combined PPF includes products covered by retailer specific promotions in the programs, different PPFs will be sent out to different retailers. More detail on the content and format of a PPF is described below in connection with FIGS. 3 and 8.

Step 220 is shown on the right side of FIG. 2, as are steps 222-230 and steps 260-262. This indicates that in at least one embodiment of the present invention, these steps 220-230, 260-262 take place on the retail store system 130. Steps 202-212 and 240-248 are on the left side of FIG. 2, and in this embodiment are performed on the server system 100. At step 220, the terminal 140 reads a user card 144. In some embodiments, the terminal 140 will verify that the card 144 is valid, such as by comparing expiration data found on the card 144 with the current date maintained by the terminal 140. Other types of validation are also possible. For instance, only a certain range of card numbers may be considered valid at any given time. Within that range, some card numbers may have been reported as lost or stolen, and then placed on an invalid card list that is periodically sent to the terminal 140 or store controller 150. In these embodiments, the terminal 140 or controller 150 would compare the card number of the user card 144 against the range of valid numbers and the black list of invalid cards to ensure that the card is valid. In other embodiments, the server system 100 is responsible for checking card numbers against a list of lost or stolen cards, and rejecting transactions involving blacklisted card numbers.

In the preferred embodiment, the terminal 140 reads both a user identifier and a program identifier from the card 144. The program identifier may be a separate data element read from the card 144, or could form a portion of a single number encoded onto the card (such as digits 9-12 in a 20-digit card number). Alternatively, the program identifier could be determined by applying an algorithm to a number found on the card. The program identifier is read at step 222, and is used to identify at step 224 those products on the PPF received by the retail store system 130 that are applicable to the program to which the user belongs. To speed up this product identification process, the PPF could be formatted in a binary-keyed format. Alternatively, the PPF could reside on the controller 150 in ASCII format. At step 226, the terminal 130 examines the products 142 being purchased by the user, and then filters those products against the relevant product identifiers in the PPF for the user's program. A primary lookup is performed based on a Universal Product Code (UPC) or Price Lookup Code (PLU) that identifies a particular product. In other words, if a user purchased wine, beer, and organic granola, and the promotions in the program only apply to the organic granola, the filtering step 226 allows only the product identifier for the granola through the filter. If the promotion applies to an entire department as opposed to a particular product, a secondary lookup is performed based on the indicated department number.

In some cases, the PPF for a program may include product groups, which are explained in more detail below in connection with FIG. 4. If some of the products purchased by the user and filtered in step 226 are part of a product group in the PPF, those products will be totaled together as a single item in the filtered list of products in step 228. This filtered list of products is then submitted along with the user ID by the controller 150 over the network 160 to the promotion analysis server 120. In some cases, the program ID may also be transmitted.

In other embodiments, the user may present two or more valid cards 144 to the terminal 140, with each card 144 representing a different program. For instance, the user may have received one card 144 from her employer and another card 144 from her insurance company. Each card represents a different program of which the user is a member. The program IDs from both cards 144 will be read in step 222, and the product and department IDs in the PPF relevant to both programs would be determined at step 224. The products would then be filtered in step 226 and grouped in step 228 based on the combined product list from both programs. The filtered items would then be submitted along with the program ID and user ID from both cards 144. Obviously, three or more cards could also be submitted in step 220 with steps 222-230 being based on the program associated with each card. In yet another embodiment, a single card is able to identify multiple programs for a single user, which would be handled the same as multiple cards that each identify a single program.

In some circumstances, the dollar value of the discount applied in step 244 will depend on the purchase price paid for the product. For instance, a 10% discount will be calculated by multiplying the purchase price by 10%. A two-for-$5 "final price" discount will calculated by determining the difference between the normal purchase price for two items and the $5 discounted price. These types of final price discounts will, of course, also be subject to a substantiation evaluation that ensures that the consumer met the requirements for the discount—namely that two items were purchased. To perform these calculations, it is important that the filtered product list sent at step 230 include the actual price paid for the products. In other cases, a product may be priced by weight, not by item. For instance, apples may be sold for $2.99 per pound. To calculate a promotion offering a $0.50 per pound discount on apples, the filtered product list must indicate the total weight (not quantity) of apples purchased that are subject to this promotion. In most cases, the proper quantity type (number of items vs. number of pounds) may be determined simply by examining the item purchased (grapes are purchased by the pound, soup cans by the can). Alternatively, the PPF could identify the proper quantity type to avoid any ambiguity.

The filtered list of products submitted by the retail system 130 to the server system 100 can also transmit details about any discounts already provided on these products at the point of sale. For instance, a customer that purchased a product that is subject to a promotion under the system 10, and may also have presented a $0.50 off coupon on that same product at the terminal 140. Each promotion can determine how this POS discount should be handled. Some promotions may decide to reduce the value of the promotion provided by the server system 100 by the value of the POS discount. Other promotions will simply ignore the POS discount in calculating any savings provided under the system 10. In still further embodiments, the method of handling POS discounts is determined on the program level, with all promotions in the program responding identically. In most cases, it will be important that the price paid for a product by a customer never be reduced below free ($0.00). With the amount paid for a product and the POS discount already provided being sent with the filtered product list at step 230, the promotional analysis server 120 will ensure that this does not occur. It can also be helpful for the entire transaction amount to be submitted at step 230 so that the promotional analysis server 120 can ensure that the total transaction amount never becomes negative. This also allows the server 120 to calculate entire transaction discount promotions, where a percentage off discounted is provided based on the total amount spend by the customer.

As described below in connection with FIG. 7, a particular program may be divided into user groups. If the program identified by the card 144 is divided into user groups, the user identifier received along with the filtered product list will be used by the promotion analysis server 120 to identify which user group in the program is assigned to the user. This is done because some user groups in a program have specific promotions assigned to it that are not assigned to other user groups in the same program. Once the user group is identified in step 240, the promotions for members of that user group are determined (step 242). These promotions are then compared with items purchased by the user in this transaction, as indicated in the filtered list transmitted by the retail store system 130 in step 230. Before discounts on the purchased products can be given, the database 115 must be referenced to determine whether or not the user has benefits available to him or her for the applicable promotions. The determination of benefits available to the user will also require the promotion analysis server 120 to determine whether all of the requirements for a particular promotion have been met. For instance, a promotion may require that the user purchase $10 of an item before the 10% off discount is applicable. In other circumstances, the promotion may require the purchase of a tie-in product. The analysis of these requirements is also performed as part of step 242 of method 200.

At step 244, those promotions that are available to the user on the purchased products are then applied and discounts for each promotion are calculated. If more than one promotion applies to a particular product on the filtered product list, the promotion analysis server 120 will use a consistent rule set to determine the order in which the promotion is applied. For instance, a percentage discount may be applied first, then a buy-one, get-one discount, and then a stored value credit would be applied. In one embodiment, a multi-pass discount rule set is applied in step 244. The use of a multi-pass rule set is described in more detail below in connection with FIG. 14.

The discounts applied are then saved in the database 115 at step 246, thereby updating the benefits available to the user for the next purchase transaction. Step 246 also records the purchases that have been made by the consumer for use in handling future discounts, as described below in connection with FIGS. 12 and 13. At step 248, the server system 100 returns information about the applied discounts to the retail store system 130. At step 260, the store controller 150 or terminal 140 then applies the discounts to the purchase transaction and updates the total amount due for the purchase in step 260. Preferably, the discounts and how they were applied are then printed on the customer receipt in step 262. The method 200 will then end.

Figure 3:
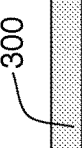
FIG. 3 is a table showing the components of a promotion product filter.

FIG. 3: PPF Contents

FIG. 3 shows the contents of a promotion product filter 300 in the form of a table. The PPF 300 contains a plurality of records, starting with a header record and ending with a trailer record with a plurality of detail records in between. Each record consists of several fields that vary depending on the record type. The detail records contain the actual list of approved products, and are therefore described in more detail herein—one of skill in the art could easily identify the contents and purposes of the fields in the header and trailer records from the information in FIG. 3.

A detail record identifies itself as a detail record in the record type field, and maintains a count of detail records in the record sequence field. Each detail record will identify a product or retailer department as belonging to a particular program. Consequently, each detail record contains a program code field to identify a program, and a product code data field to identify a particular product or department. As shown in FIG. 3, the first digit of the product code identifies whether the product code contains a universal product code (UPC) or Price Lookup Code (PLU) (when the first digit is a 0), or a department code (when the first digit is a 2). Each retailer uses different codes to identify their departments. For example, one retailer may identify fruits and vegetables as department 10001, and deli items as department 10002, while another retailer may use a different numbering scheme. This means that the server system 100 must have knowledge of the actual department numbering scheme used by the retailers that support the system 10 in order to provide department level promotions.

The product group code field, if used in a record, identifies a particular product as belonging to a product group. The product group code can be used to consolidate multiple different products into a single entry in the filtered list provided by the retail store system 130. This is described in more detail in connection with FIG. 4. The type code field identifies a particular product as belonging to a special select product type. The type code field is used to help the server system 100 apply special additional discounts and rewards. In one embodiment, the type code is used to indicate that the second and third pass of the multi-pass discount rule set (see FIG. 14) applies to this product. The type code is included with the filtered product list that is sent from the retail store system 130 to the server system 100. A single product may have both a product group code and a type code. The authorization type field allows for partial functionality of the server system 100 (such as substantiation only and no discount calculation at the server system 100). This embodiment is described in connection with FIG. 15 below. The settlement code field allows for communication from the server system 100 to the retail store system 130 concerning how payment for each discount will be handled.

Figure 4A:
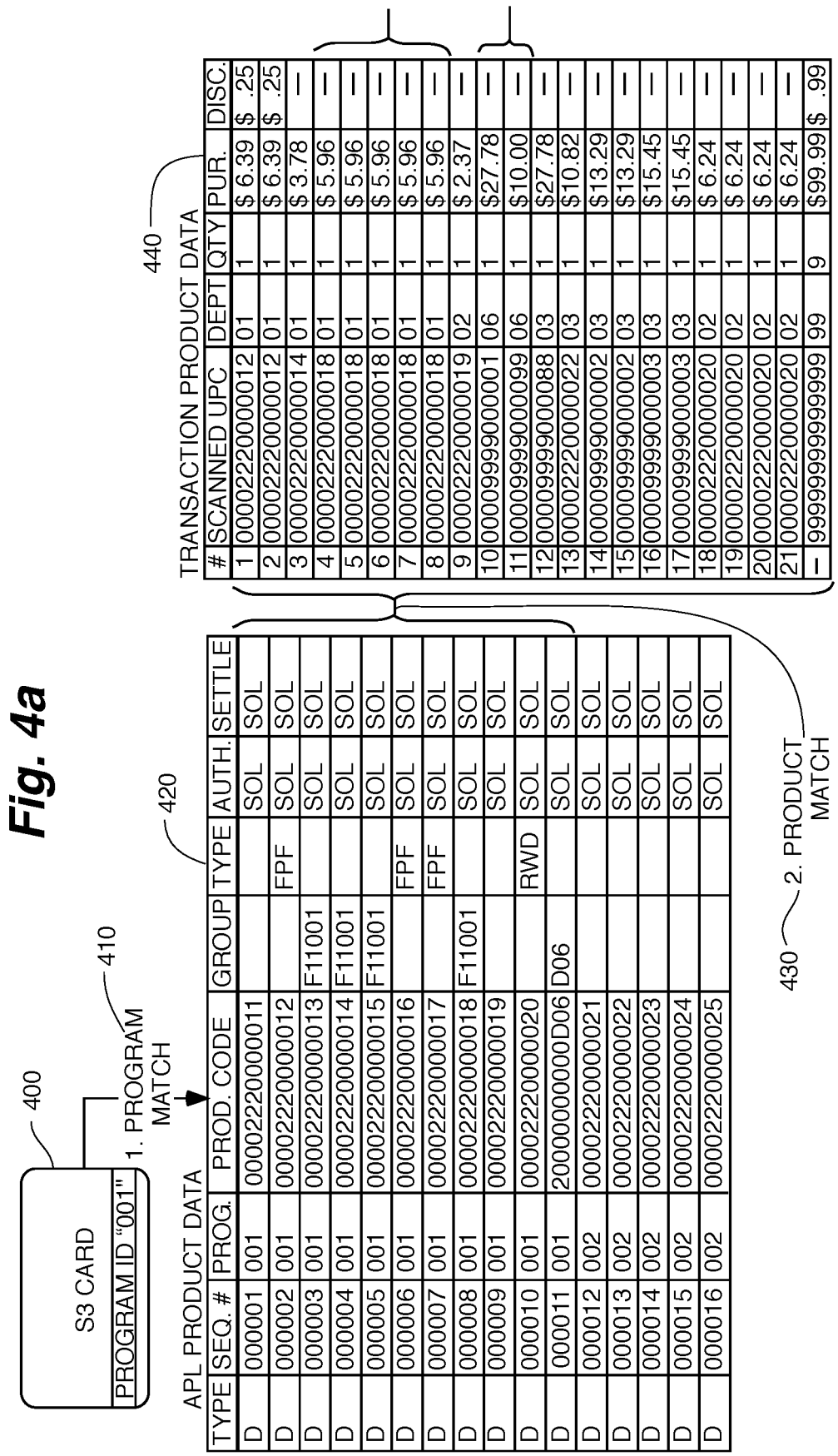
FIG. 4 (which is divided in sheet 4a and 4b in the Figures) is a schematic diagram showing the process of filtering purchased products using a promotion product filter and rolling up products within a group.

FIG. 4: Filtering Example

FIG. 4 provides an example how a promotion product filter 420 can be used to filter product purchase data 440 into a filtered product list 460 and eventually a filtered product list with group rollup 480. In this example, a user card 400 is presented that contains a program ID of "001". The PPF 420 (shown as "APL Product Data" in FIG. 4) received by the retail store system 130 from the server system 100 is consulted to identify those data records that relate to this program 001. In FIG. 4, data records 000001 to 000011 relate to program 001, while data records 000011 to 000016 relate to program 002. The identification of relevant promotions in the PPF 420 based on the program ID on the card 400 can be referred to as the program match, as indicated by arrow 410. Note that data records 000001-000010 relate to particular product UPC or PLU codes and not departments, as in each case the product code field starts with the numeral 0. Data record 000011 relates to a department code, because the product code field starts with the numeral 2. The department product code after the numeral 2 (and after the leading zeros) is "D06." This data record 000011 also designates the group code as D06. Four of the product codes are part of group F11001. In addition, three of the codes have a type code value of FPF and one has a type code value of RWD. The type code values FPF and RWD indicate that the corresponding products belong to a special select product group that may be eligible for special additional discounts.

The eleven relevant promotions in the PPF 420 are then used to filter all of the items purchased by the user. The scanned UPCs for purchased products 142 are shown in table 440, which includes a product identifier (UPC or PLU), a department code, a quantity, a purchase price, and a discount that has already been applied to this product by the terminal 140. These already-applied discounts are not related to promotions managed by system 10, and may include, for example, paper coupons presented by the user at the terminal 140. In step 430 the product codes of the relevant promotions in PPF 420 are matched against the scanned product codes in transaction product data table 440. Product data filtering occurs at product-level filtering 450 and department-level filtering 455. The primary product-level filtering 450 matches scanned UPCs in table 440 to product codes in PPF 420. The secondary department-level filtering 455 matches a department code in table 440 to a department product code in PPF 420. The resulting filtered product list 460 indicates those products that were purchased by the consumer for which promotions are being maintained by the system 10 for program 001. The list 460 includes not only the product identifiers, but also the department code, purchase price, purchase quantity, and the previously applied discounts. The process 450 includes rolling up multiple entries of a single product identifier in the transaction product data 440 into a single row of the filtered product list 460, which indicates the total quantity and price paid for all of the items.

Two of the products in the filtered products list 460 are part of group F11001. These group members are combined in group rollup step 470, and put into a single entry in discount request table 480, having the group identifier F11001 as the product code. The department rollup 475 combines the filtered department 06 group members into a single entry in table 480. The discount request table 480 contains a product or group code, a type code, a purchase price, a purchase quantity, and previously applied discounts.

The discount request data table 480 is sent to the server system in step 230, described above.

Notably, the filtered product list 480 is the complete set of information that is shared with the server system 100. The transaction product data 440, containing a record of all products purchased in the transaction, is not passed to the server system 100. This is advantageous for retailers who wish to keep secret the valuable business analytic data that is obtained from customer transactions.

The server system 100 receives the table 480 and performs the processes described in connection with steps 240-248 in FIG. 2. The table 490 of FIG. 4 represents the data that the server 100 sends back to the retail store system 130 in step 248. The discount response table includes the product or group code, a product type, the purchase price, the purchase quantity, a total discount, a discount type (P, T, X, or Y), and an abbreviated description of the discount applied. The "FPF" entry in the product code column of table 490 indicates that a special additional discount was applied. The retailer then uses these discounts to calculate the total price for the purchase.

The discount types X and Y represent discounts sponsored by the retailer processing the transaction. Discount types P and T refer to discounts sponsored by outside sources such as product manufacturers, employers, insurance companies, or other entities providing discounts. When calculating sales tax on a customer's purchase, the retailer-sponsored discounts X and Y are treated as a price reduction, but the outside discounts P and T are treated as tender. The X and Y discounts are not taxed, but the P and T discounts are taxed. In this way, the burden of determining taxable and non-taxable discounts is shifted from the retailer to the system server 100.

FIG. 5: Alternative Method Description

The method 500 of FIG. 5 presents an alternative understanding of one embodiment of the present invention. In FIG. 5, steps on the left hand side are performed at or for the retail store system 130, and steps on the right hand side are performed at or for the server system 100. The method 500 starts at step 502 with the reading of a bar code presented by the user. It is highly preferable to read a bar code at a retail store terminal 140 rather than a magnetic stripe, as almost all retailers provide only a single magnetic stripe reader at a terminal. This terminal is generally configured to read credit card and debit card numbers from the mag stripe on credit or debit cards, and to send transaction and card number information into proprietary, third party payment networks. It is exceedingly difficult to program additional functionality into magnetic stripe readers given the relatively closed nature of the system. Furthermore, it is very difficult to use data from the magnetic stripe readers outside of the third party payment networks, which typically will charge other parties a per-transaction fee to receive and send data through their network. By optically reading a bar code provided by the user, these difficulties can generally be avoided.

Note that the bar code could be found on a program card, such as card 144. In other embodiments, an app is provided to a user smart phone that allows users to view and maintain some of the information about them and their benefits saved in the data 115 maintained by server system 100. This app is preferably configured to display a bar code on the screen of the smart phone that can be read by the bar code reader attached to the terminal 140. In other embodiments, a wireless transmitter (such as an NFC or RFID transmitter) on the smart phone will transmit to a receiver on the terminal 140 the same information that is provided via the bar code. In particular, the bar code or wirelessly transmitted information should provide at least a user identifier, but it may also provide a program identifier.

At step 504, the retail store system 130 creates a list of purchased products, and then sends that information to the server system 100 in step 506 along with the user ID. It may not be necessary to filter the purchased products using a promotion product filter if the communication speed over the network is sufficiently fast. In one embodiment, all purchase data is transmitted to the server system 100. Because the magnetic stripe reader is not utilized, it is not necessary to send this information over a dedicated payment network. In one embodiment, a virtual private network between the server system 100 and the retail store system 130 is created over the Internet 160 to ensure fast, direct, and secure communications between these systems 100, 130.

At step 520, the server system 100 identifies promotions available for the user based on the transmitted user identifier. The server system 100 may also use an identifier of the retail store system 130 sent at step 506 to identify promotions that are available only at that retailer. At step 522, the server system identifies the purchase requirements that apply to these promotions. Promotions with purchase requirements are not available for use until the consumer has purchased the items necessary to trigger the discount.

At step 524, the server system makes a first past through the purchased products to determine which product purchases may be relevant to the purchase requirements of the promotions. If all purchased products are transmitted to the server system 100, all of the products are compared with the purchase requirements identified in step 522. If the purchased product list is filtered against a PPF, the PPF will include all products that are relevant to purchase requirements in the relevant promotions, even if those products are not directly discounted by the promotions. In some cases, the products purchased in this single transaction may satisfy the purchase requirements for the promotions. For example, a promotion may provide $1 in stored value that can be used for the purchase of fruits and vegetables as soon as the user has purchased at least $20 of a certain brand of beef. The first pass through the purchased products in step 522 might identify that the purchased product list created in step 504 includes a purchase of more than $20 of the identified beef. As a result, the $1 promotion for fruits and vegetables will be immediately available for the customer to use. When allowed by the promotion, step 522 may analyze prior purchase behavior of this customer along with the current purchase transaction to determine whether a promotion is available. For instance, the user may have only purchased $16 of the identified brand of beef in this transaction, but had also purchased $13 of the beef in a prior transaction. If allowed by the parameters of the promotion, step 522 will identify that the total amount purchased over the two transactions exceeds the purchase requirement, and therefore identifies the $1 promotion for fruits and vegetables as being available for use. To allow the inclusion of prior purchases in determining whether purchase requirements for promotions have been met, the server system 100 will need to store relevant product purchases by the user for future recall and analysis.

In another example, a promotion may require that a consumer buy three different flavors of a product before offering $2.00 off on a new flavor. All purchases of these products, including both the triggering flavors and the discounted new flavor, are tracked by the server system 100. This allows purchases made in previous transactions, even transactions made on a different date, to be used by the server system 100 to determine whether the reward discount has been earned. In one embodiment, these purchases can even be made at different, unrelated (or unaffiliated) retailers, allowing a customer to earn a reward by purchasing products at one retailer, and then redeeming the promotional reward as part of a purchase at another retailer. A retailer is unaffiliated with another retailer when the retailers are not part of the same chain of retailers, are not under common ownership, and are not owned by entities that are affiliated with one another (such as parent, child, or sister corporate entities).

By determining whether purchase requirements were satisfied in a first pass through the purchased product list, the server system 100 is able to make the earned promotion available for use during the same purchase transaction. Thus a user can earn a promotion and receive the discount from that promotion in a single transaction. In the preferred embodiment, the earned discount can also be saved and used during a later transaction.

It is also possible to implement a promotion with a single purchase requirement that provides two different benefits. For instance, a brand owner may provide a $1 off discount coupon for the purchase of their product. In addition, upon making this purchase, the brand owner may provide a small $0.25 credit for the purchase of another product, such as fresh fruits and vegetables. On the first pass, the promotion that requires a purchase of the item will be identified and triggered because of the purchase. The $1 off discount could be immediately applied. The $0.25 credit could be noted in this first pass. On a second or later pass through the purchased products, the purchase of fresh fruits in this purchase transaction might be identified, and the $0.25 credit would then be given on that purchase. If the consumer did not purchase any fresh fruits or vegetables in that purchase transaction, the $0.25 credit would be stored in the database 115 so that the credit would be available for use in future purchase transactions. In the preferred embodiment, the brand owner would be immediately charged $1.25 for the transaction ($1 for the discount on the purchase of the product, and $0.25 for the credit that is being stored in the database 115 for future transactions), even though the $0.25 credit was not made available to the consumer at this time.

At step 526, the server system 100 makes a second pass through the purchased products in order to match those purchases against the available promotions. For each promotion, the server system 100 also determines whether or not the user has benefits available under that promotion. For instance, a buy one/get one promotion may be usable only once per calendar month, and the server system 100 will determine whether the user has taken advantage of the promotion in the current month before applying the promotion to the purchased products.

At step 528, the server system 100 identifies a plurality of promotions that are available to the user for a purchase of a single product in a transaction. For instance, an employer could offer a 10% discount on all whole grain cereals, while the cereal manufacturer may provide a buy one box, get a second box free promotion on their whole grain cereals. The server system 100 uses a rule set to determine the order in which the promotions are applied and then applies both promotions to the purchase. In this case, the promotions are provided by different sponsors (the employer and the cereal manufacturer), both of who will reimburse the retailer for providing the discount to the user. The method 500 provides a very powerful way to apply multiple promotions, because multiple discounts of different types (percent discount vs. buy one/get one vs. dollar discounts vs. reward discounts for past behaviors) can be applied to a single purchase, even where those different discounts have completely different paying sponsors. In one embodiment, in step 526 the server system 100 executes a rule set with multi-pass discounts as described below in connection with FIG. 14.

At step 530, all discounts that apply to the purchased products are calculated and identified in a communication to the retail store system 130. In one embodiment, this includes discounts that were only earned because purchases in this transaction satisfied a promotion's purchase requirements. At step 540, the store system 130 applies the discount to the purchased products 540. In one embodiment, once the transaction is complete a verification signal is sent to the server system 100 at step 542 to indicate that the transaction is complete and the discounts have been given to the user. This communication informs the server system 100 that reimbursement for the discount should be provided to the retailer. This confirmation message 542 is required because it is always possible that the user will cancel part or all of the purchase transaction after the discount has been calculated and sent by the server system 100 at step 528. If the user cancels the transaction, then it is inappropriate to reimburse the retailer for the discount provided. When the server system 100 receives this verification, the data concerning the provided discounts are saved in the database 115 at step 560 so that the user cannot reuse promotions beyond what was intended.

At step 562, the server system 100 determines the sponsor for each of the promotions applied to this transaction, and also determines a financial account for each transaction. In the example above, the employer is the sponsor for the 10% discount promotion; while the cereal manufacturer is the sponsor for the buy one, get one promotion. In step 564, an account for the sponsor of each of the applied promotions is debited to pay for the discount provided to the user. As indicated at step 566, the system 10 can be designed to have sponsors establish a financial account that contains funds that are used to pay for the promotions that they are sponsoring. As a result, the system 10 can be assured that the money to pay for the promotions is immediately available upon debiting the account at step 564. At step 568, the server system 100 provides a credit for a retailer account equal to the provided discounts. This credit could be provided by submitting a request for payment to the retailer account from a promotion sponsor account managed by the system 10 through the ACH network 122.

If the retailer itself sponsors a promotion, no payment needs to be made to the retailer for that promotion. Instead, an accounting of all redeemed retailer-sponsored promotions is provided to the retailer. The retailer can use this data to charge the promotion to a particular department (e.g., to charge a discount on apples to the produce department). The retailer can also use the promotion use data for business analytics.

As an alternative to the verification transmission 542, the system 10 can be designed to automatically provide reimbursement to the retailer once the discounts are sent to the retail store system 100 in step 528. In this alternatively embodiment, the retail store system 130 would be responsible for sending a cancel message if the user canceled the transaction before being granted the discount. If the cancel message were to be received, the automatic reimbursement transfer would have to be reversed. By delaying steps 564 and 568 for a predetermined time period after sending the discount information in step 528, it should be possible to greatly reduce the number of financial transfers that would have to be reversed. The same could be done with the database update in step 560, although reversing a database change would involve fewer difficulties than reversing financial transactions.

Note that steps found in method 500 can be added to method 200, and vice versa, as desired. For instance, it is contemplated that steps 524, 526, 542, and 560-568 could be added to method 200 without difficulty.

Figure 6:
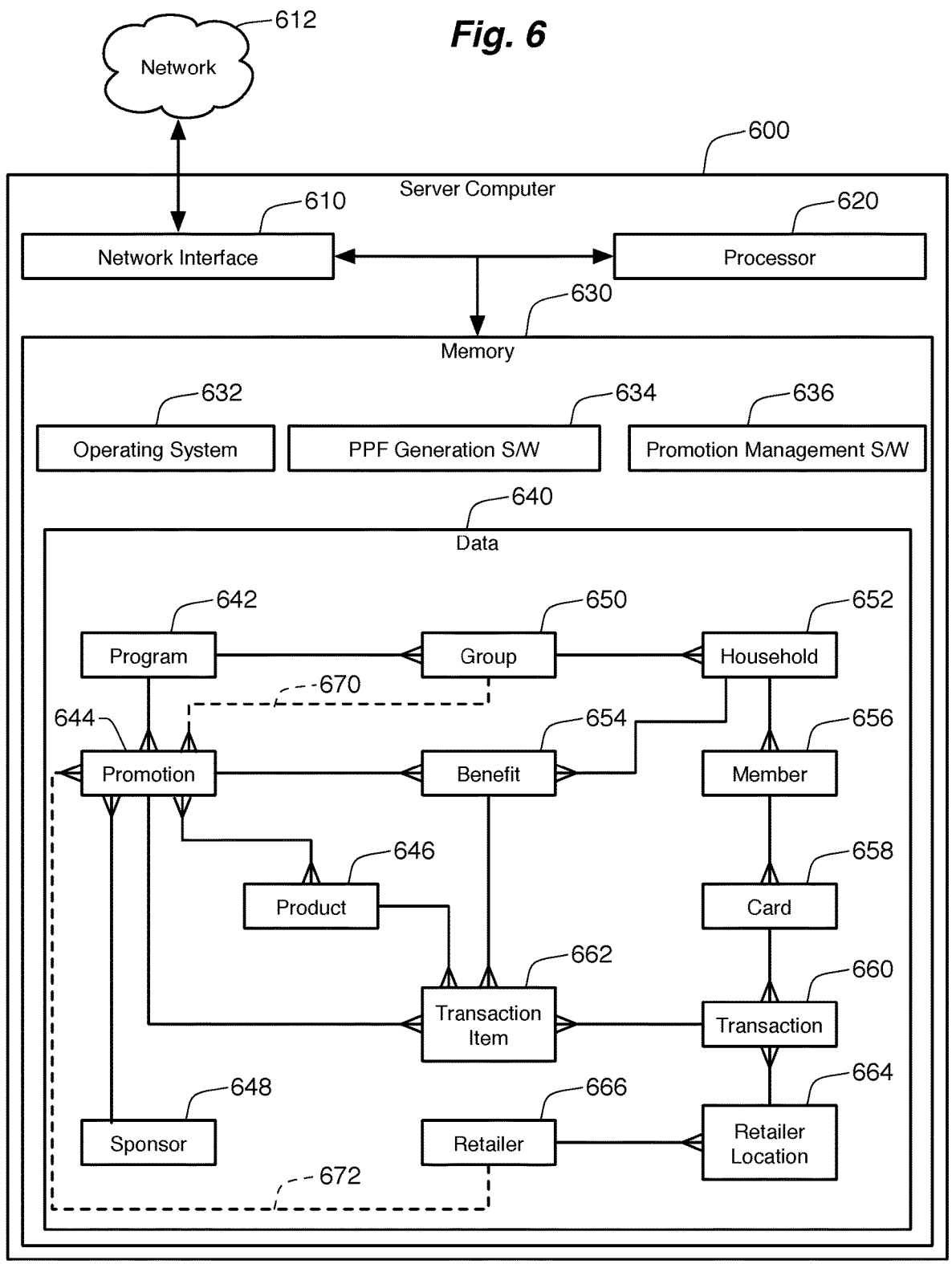
FIG. 6 is a system diagram showing the components of one embodiment of a server computer including the content of the data maintained by the server.

FIG. 6: Computing Configuration and Database

FIG. 6 shows an embodiment of the server system 100 in which a single server computer 600 operates as both the PPF server 110 and the promotion analysis server 120. The server computer 600 includes a network interface 610 designed to provide communications with remote devices over a network 612. In one embodiment, the network 612 is the Internet, and the network interface 610 includes TCP/IP protocol stacks for communicating over the network 612. The network interface 610 may connect to the network 612 wirelessly or through a physical wired connection. The server computer 600 further includes a programmable digital processor 620 designed to operate programming code stored on a memory 630. The processor 620 is preferably a general purpose CPU such as those manufactured by Intel Corporation (Mountain View, Calif.) or Advanced Micro Devices, Inc. (Sunnyvale, Calif.). Memory 630 preferably includes a non-volatile, non-transitory, computer readable medium such as a hard drive or flash memory device. Software instructions 632, 634, and 636 found on the memory 630 instruct the processor 620 how to perform the methods of the present invention, including the methods 200, 500 set forth in FIGS. 2 and 5 above. More specifically, the operating system instructions 632 perform OS management functions that allow the server computer 600 to operate while the PPF generation software 634 allows the server computer 600 to operate as the PPF server 110. Similarly, the promotion analysis software 636 allows the server computer 600 to operate as the promotion analysis server 120. To improve efficiency, the processor 620 may load software instructions 632, 634, 636 from non-transitory portions of memory 630 into a faster but volatile RAM portion of the memory 630. Data 640 operated upon by the processor 620 can also be stored in non-volatile memory and retrieved into RAM for analysis, recording, and reporting.

The construction of the terminal 140 and store controller 150 is similar to the server computer 600 in that each device contains a processor 620 and programming instructions 632-636 on memory 630 that instruct the processor 620 on how to perform the methods of the present invention. As explained above, any of these devices 110, 120, 140, 150, 600 could easily be implemented as multiple physical computing devices operating together to perform the functions provided in the software.

In the preferred embodiment, the data used by the server computer 600 is stored in a database 640 managed by processor 620 under software programming instructions 634, 636. The database 640 can store data in pre-defined fields in a database table or as database objects in an object-oriented database environment. FIG. 6 shows the database 640 with tables or objects for programs 642, promotions 644, products 646, sponsors 648, groups 650, households 652, benefits 654, members 656, cards 658, transactions 660, transaction items 662, retailer locations 664, and retailers 666. The database 640 tracks relationships between each of the data entities 642-666, which are shown using crow's foot notation between the entities in FIG. 6. For instance, FIG. 6 shows that a single program 642 can be associated with a plurality of promotions 644. As shown in FIG. 6, it is possible to define promotions 644 for a plurality of products 646. For example, a promotion could provide $4 of frozen vegetables of an identified brand every month. This would constitute a single promotion 644, but could apply to a great many products 646. The products 646 to which the promotions 644 apply can be defined by a product number, but can also be defined by a department number, in which case all products in the particular department are included in the promotion 644. Once the promotion 644 was used on any of those products 646, it might be unavailable for any of the products 646 until the next month. Each promotion 644 defines a specific discount, such as 10% off an item. Each promotion 644 also includes the purchase requirements and caps that must be met for the promotion 644 to be applied. Promotions 644 can also define a date range during which the promotion 644 is valid. FIGS. 11 and 12, described below, provide additional information on defining discounts for a promotion 644.

In FIG. 6, each program 642 is associated with one or more groups 650, which are described in more detail in connection with FIG. 7. In many cases, the promotions 644 are associated directly with a program 642, but it is possible to assign promotions 644 directly to a group 650 as shown by the dotted crows foot notation 670. Households 652 are assigned directly to groups 650, with each household 652 being assigned to a single group 650 in a program 642. Benefits 654 are tracked at the household level 652 and are associated with promotions 644. When a household 652 uses a promotion 644, such as $4 of frozen vegetables every month, the benefit table or object 654 tracks this use. When step 242 determines available promotions for the user in method 200, the benefits 654 for the user's household 652 are consulted along with the available promotions 644 for the user's group 650 and program 642. It is possible to implement the benefit table 654 with effective start and end dates. To determine whether the user has used up an available promotion for the current time period, the start and end dates will be examined. For example, a user may wish to take advantage of the $4 of free frozen vegetables. If they had not used this promotion this month, no benefit record 654 would have been created for the promotion 644 that is relevant to the current time period. This would indicate that the user has used none of the benefit 654. A benefit record 654 can then be created with the appropriate start and end date (such as the beginning and end of the current month), and the record can indicate the total quantity available for this promotion (such as 4 for four dollars). If the user purchased only $2.39 of frozen vegetables, the benefit record 654 would record that usage. If another attempt to purchase frozen vegetables were made that month, the benefit record 654 would be recalled, and the vegetables could then be discounted the $1.61 remaining in the promotion for this month. The benefit record 654 would then be updated to indicate that the user had used the entire $4.

Benefits 654 are tracked at a household level 652, which may include multiple (family) members 656. Each member 656 would typically be issued a single card 658, although the issuance of replacement cards 658 would mean that multiple cards 658 could be associated in the database 640 with each member 656. This organization of the database 640 allows the purchasing behavior of each family member 656 to be tracked while ensuring that promotions 644 in the program 642 are provided on a household-by-household basis.

When a retail store system 130 submits a list of purchased products to the server system 100 (step 230 or 506), a new transaction record 660 is created. The transaction record 660 indicates when (date and time) and where (retail location 664 and terminal identifier) the transaction took place. The transaction record 660 also indicates which card (or cards) 658 was used in the transaction to allow easy identification of the member 656 and household 652 that made the transaction. A plurality of transaction items 662 are associated with each transaction 660, with each transaction item 662 tracking the purchase of a product 646 under a promotion 644. The transaction item 662 is also associated with a single benefit 654 record, indicating that the benefit record 654 was created or modified as a result of this transaction item 662 (or that the benefit was used up and no discount was provided for this transaction item 662). In one embodiment, the receipt of a filtered list with multiple entries (such as list 480) by the server system 100 would trigger the creation of one transaction record 660 and a plurality of transaction items 662 (assuming the user was otherwise eligible for all of the promotions). Some entries in the list may create zero transaction item records 662 (where the user was not eligible for any promotion on that product), while other entries may create one or more transaction item records 662 (depending on the number of eligible promotions that apply to that product). Where tie-in promotions (discussed in further detail below) are involved, the purchase of a tie-in product will be recorded in a transaction item record 662.

Each retailer location 664 is likely associated with a plurality of transactions 660 but only a single retailer 666. While some retailers 666 have an only a single location 664, the database 640 allows multiple retailer locations 664 to be identified as belonging to a single retailer 666. As described above, it is possible that some promotions 644 are defined to be associated with only a single retailer 666. This is shown in FIG. 6 as dotted association 672, and described in more detail below.

FIG. 6 should not be taken to indicate that the data entities 642-666 in system database 640 need to be implemented exactly as shown, with each entity 642-666 in the Figure implemented as a single database table or object. Rather, FIG. 6 merely indicates that one or more database entities are created within database 640 to track this information. It is well within the scope of the prior art to implement this type of data using a variety of entity architectures.

Figure 8:
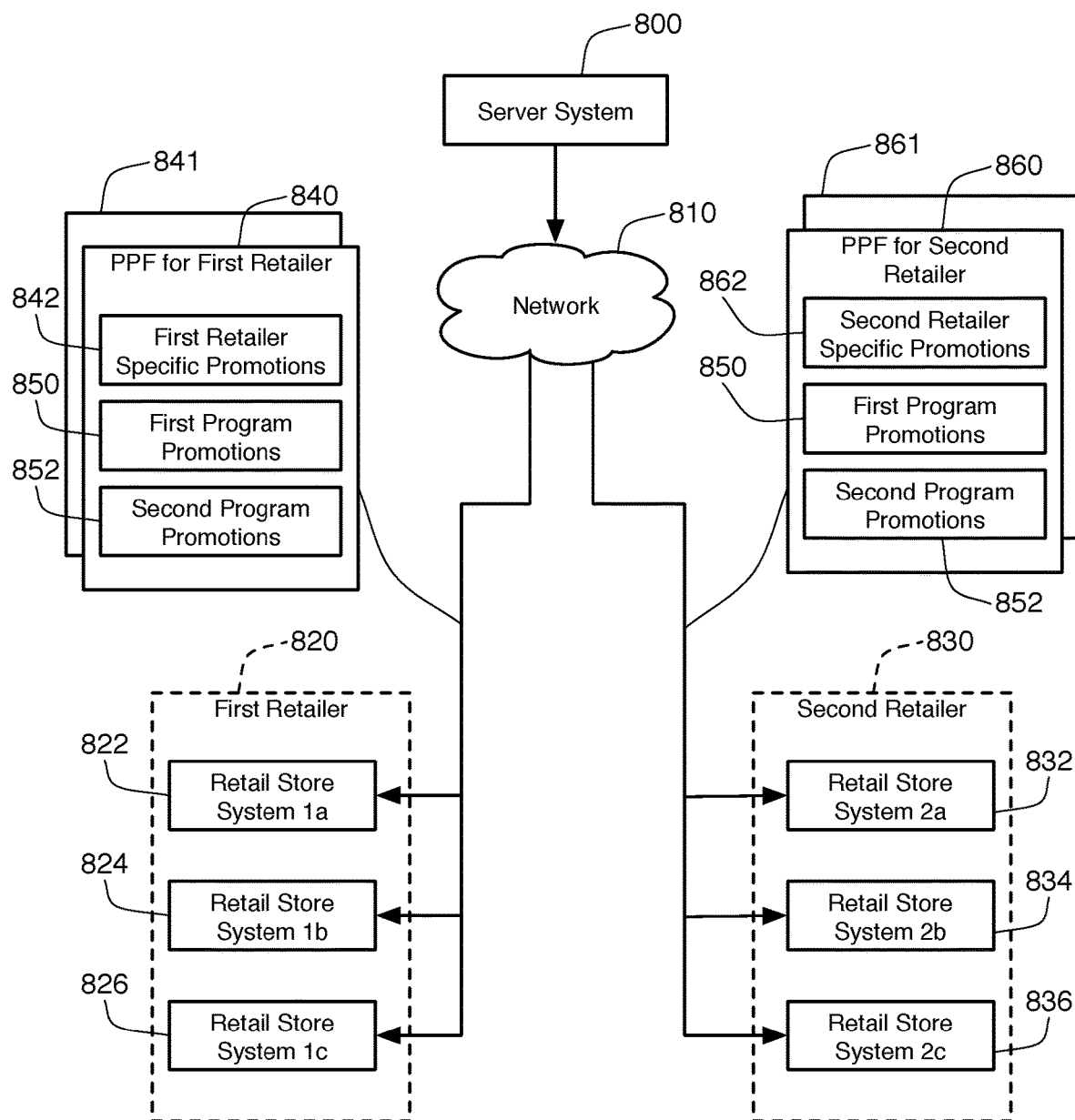
FIG. 8 is a schematic diagram showing the transmission of retailer specific promotion product filters to retailer store systems for two different retailers.

FIGS. 7 and 8: Structure of Programs and Groups, and Retailer Specific PPFs

FIG. 7 shows schematically the relationship between programs 642, promotions 644, and groups 650. The first program 700 is designed to provide a plurality of promotions to users. The first program 700 might be created by a large entity, such as a health insurance provider, and the users of the program might be insureds that receive insurance from that provider. In one embodiment, a supervising entity operates the server computer 600 and creates model programs. When an entity such as an insurer decides to sponsor a new program, such as program 700, this new program 700 can be based on the model created by the supervising entity. If the health insurance provider establishes a program 700, it is agreeing to provide a set of promotions 710 as part of that program 700. These promotions 710 can be based upon promotions suggested in the model program, or can be developed specifically for the insurer. In some embodiments, when the health insurance provider becomes the sponsor for the program 700, the insurance company also becomes the entity ultimately responsible for compensating the retailer for the value of its promotions 710. The insurance company sponsor can then encourage each of the employers that provide the health insurance to their employees through the insurer to add additional benefits to the program 700. Each different employer would create a different group 730, 740 within the first program 700 and provide additional promotions to its employees. In FIG. 7, a first employer creates a first group 730 and establishes first group promotions 732 for its employees, while a second employer creates a second group 740 and establishes second group promotions 742 for its employees. In addition, the insurance company may approach a variety of retailers to see if they wish to encourage use of these promotions at their retail establishment by providing their own promotions. In FIG. 7, one retailer has agreed to sponsor multiple retailer specific promotions 720.

In other scenarios, there is not a one-to-one correspondence between "programs" and sponsors. A supervising entity operating server system 100 can create a master program and invite multiple parties to sponsor members in the program. For instance, a single program might have multiple insurance companies participating as sponsors. Each insurance company can invite their insureds to use the program, with each insured being identified in database 640 with their insurance company sponsor. The sponsor would then be responsible for compensating the retailer for the value of the promotions provided to their insureds.

Another entity (such as a government agency providing benefits to citizens) could establish or sponsor a second program 750 with second program promotions 760, and then establish a third group 770 with third group promotions 772 and a fourth group 780 with fourth group promotions 782. Some of the users of the second program 750 do not qualify for any additional programs other than the second program promotions 760. To ensure that all users are assigned to a group 650 within a program 642 in database 640, a fifth group 790 is established that has no group specific promotions 644.

Users are associated with at least one of the groups 730, 740, 770, 780, or 790. All of the insureds of the insurance company that established the first program 700 would receive identification (such as cards 144, 400 or a mobile device app) that identifies the first program 700 to the retail store system 130. This allows the retail store system 130 to identify which promotions on a PPF 300 might relate to the user. The list of promotions in the PPF 300 associated with the first program 700 will include promotions for all groups 730, 740 in the first program 700 even though the user will belong to only a single group. The server system 100 would identify which group (or groups) 730, 740 is associated with the user by first determining the household 652 and group 650 in the database 640, and then by identifying all the promotions currently available for that user. For example, a user who is a member of the first group 730 would be eligible for the first program promotions 710 and the first group promotions 732 but not the second group promotions 742 or any of the promotions 760, 772, 782 associated with the second program 750. If this user shops at the correct retailer, they would also be eligible for the retailer specific promotions 720. In embodiments where a user could present multiple cards to a retailer in a single transaction, it would be possible for that user to be eligible for two different programs, with promotions in each program being analyzed to determine discounts applicable to a single transaction.

All of the non-retailer specific promotions 710, 732, 742, 760, 772, 782 in all of the programs 700, 750 are provided to all retailers participating in the system 10 in a single promotion product filter 300. Any retailer that has retailer specific promotions 720 in any of the programs 700, 750 will receive a customized promotion product filter 300 that includes their retailer specific promotions 720 in the programs 700, 750. This is seen in FIG. 8, where a server 800 provides a first version of a PPF 840 for a first retailer 820, and a second version of a PPF 860 to a second retailer 830. The server 800 may also provide the retailers 820 and 830 with additional PPFs 841, 861 to be implemented by the retailers 820, 830 on a predetermined future date. As explained above, these PPFs 840, 841, 860, 861 can be transmitted from the server system 800 via a VPN connection over the Internet. If the PPFs are updated daily, then it will be preferred to generate all PPFs at least two days in advance so that the next two PPFs will be ready for downloading at any given time. Of course, emergency PPF updates make it possible to update a PPF as soon as it is determined to be out of date, as occurs in steps 930 and 940 as described below.

The PPF 840 for the first retailer 820 includes promotions 842 specific to the first retailer 820 as well as the promotions in the first program 850 and the second program 852. The PPF for the second retailer 860 includes promotions 862 specific to the second retailer 830 as well as the promotions in the first program 850 and the second program 852. Note that FIG. 8 shows the retailer specific promotions 842, 862 outside the context of the promotions for specific programs 850, 852. As this infers, one embodiment of the system assigns retailer specific promotions to all customers shopping at the retailer without regard to the program of the customer. In other embodiments, retailer specific promotions are always assigned to a particular program. If retailer specific promotions are applied outside the context of the programs, then the software operating on the retailer's controller 140 must be certain to filter against products covered by retailer specific promotions in the PPF as well as against products in the PPF associated with the customer's program. FIG. 8 also shows that the PPF 840 for the first retailer 820 is provided to all the retail store systems 822, 824, 826 operated by the first retailer 820, while the PPF 860 for the second retailer 830 is provided to all the retail store systems 832, 834, 836 operated by the second retailer 830.

One embodiment of the present invention requires the communications from the first retailer 820 to include a first merchant identifier and communications from the second retailer 830 to include a second merchant identifier. These merchant identifiers allow the server system 800 to identify the retailer 820, 830 from which it is receiving the communication. Regardless of whether merchant identifiers are presented during communication, the server system 800 is designed to push the PPFs 840,841, 860, 861 to the particular retail store systems 822, 824, 826 and 832, 834, 836, and hence will know which version each system 822, 824, 826 and 832, 834, 836 should receive.

Figure 9:
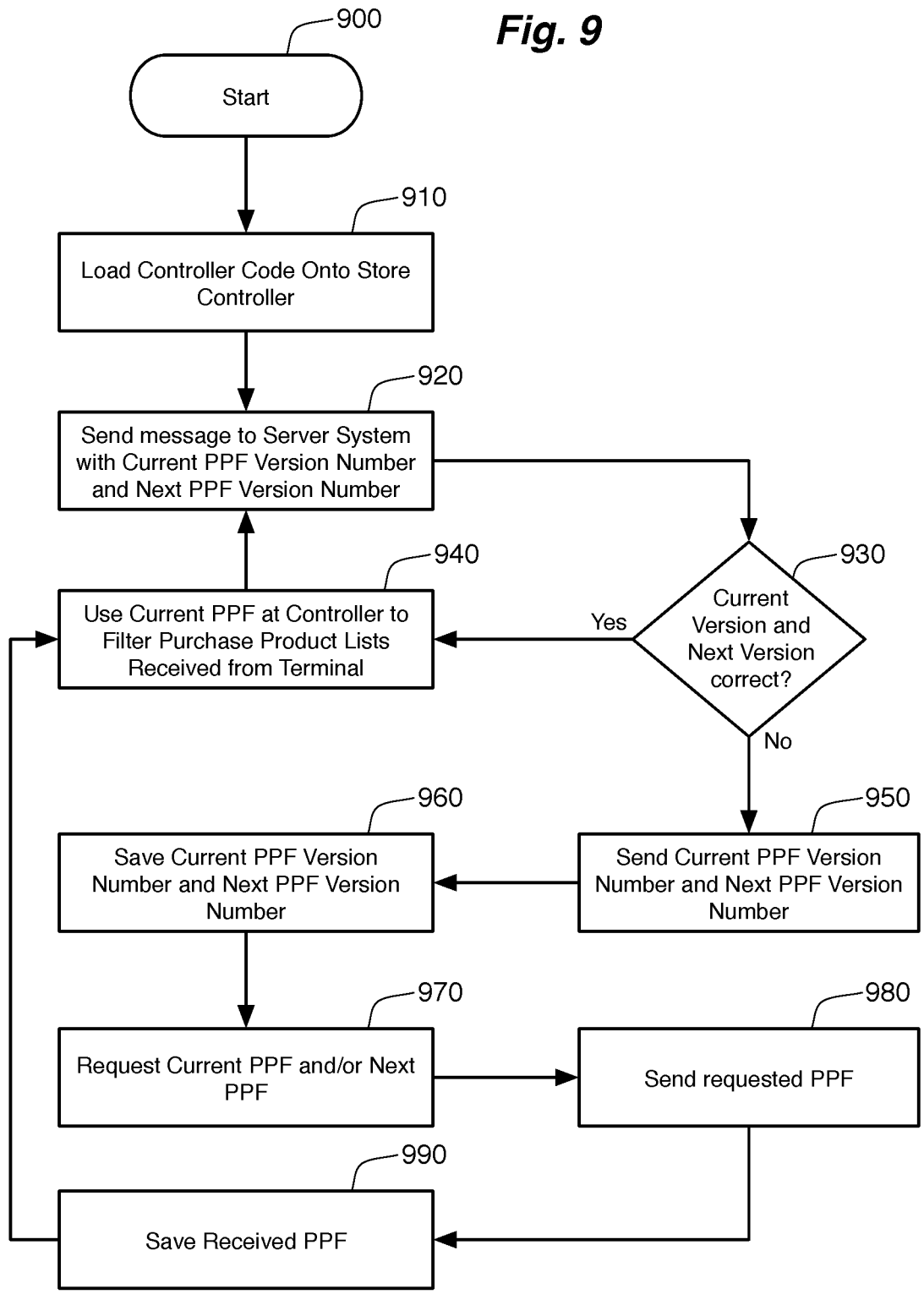
FIG. 9 is a flow chart showing a method of updating a promotion product filter at a store controller.

FIG. 9: Method for Updating PPFs

In the preferred embodiment, the PPFs 840, 841 and 860, 861 are provided to the retail store systems 822-826 and 832-836 in a regular manner, such as by the method 900 set forth in FIG. 9. In FIG. 9, the steps that appear on the left side of the page indicate that the steps are performed at a retail store system such as retail store system 822. In particular, the steps on the left side are performed by a store controller (such as store controller 150) operating at the retail store system 822. The steps that appear on the right side of the page indicate that the steps are performed at the server system 800. The method 900 can be used at any of the retail store systems of FIG. 8.

In the flow chart of FIG. 9, a "Current List" refers to PPF 840, which is actively used by retail system 822 between a particular start date and end date. A "Next List" refers to PPF 841, which is saved at the retail system 822 to be implemented at a predetermined future start date. Each of these PPFs 840, 841 has a version designation containing information regarding an implementation date and a version number for that particular PPF. In one embodiment, the date and version number are presented as a combined a 3-digit date (day-in-the-year) and a 3-digit sequence number, starting at 001. Thus, a version designation for a PPF implemented on January 31 would be designated "031001." If a PPF for January 31 needs to be updated, for example if an error needs to be corrected or new promotions added, a new version of the PPF would be designated "031002."

In one embodiment, all product filtering (such as that performed at step 226) occurs at the store controller 150 level. This means that only the controller 150 at a retail store system 130 needs access to the current PPF. The various terminals 140 at a retail location can rely upon the controller 150 to handle product filtering. As a result, the terminals 140 do not need to be updated or otherwise altered when a new PPF is created by the server system 800.

To operate, the controller 150 at retail system 822 must have appropriate programming code installed, which occurs at step 910. In step 920, the controller 150 sends a communication to the server system 800 under the guidance of this programming. The programming instructs the controller 150 to send the Current Version number for PPF 840 and the Next Version data for PPF 841 (e.g., "031001" and "038001") in that communication to the server 800. The Current Version number and Next Version number may be included in a data field of the message header (as shown in FIG. 3 as "APL Version Number." For example, the messages of step 920 may be communications to the server 800 for discount authorization, confirmation, or cancellation. The message may also be a "heartbeat" message sent from the controller 150 at retail system 822 to the server system 800 every 10 minutes if no other communications occur.

In step 930 the server system 800 receives the message and reads the Current Version number and the Next Version number from the message. If there have been no changes to the PPFs 840, 841, the server 800 does not take any additional action. As a result, the controller 150 at retail system 822 uses its current PPF to filter purchased product lists that the controller 150 receives from the terminal 140 at step 940. The controller 150 then continues to send the current and next PPF version numbers to the server system 800 at step 920.

If the server system 800 has made any changes in the PPF 840 or the PPF 841, the updated PPFs will have new version designations. In this case, in step 950 the server system 100 will send an error message to the controller 150 indicating that one or both the system's PPFs are out of date. This error message will include the correct version designation for both the PPFs (the Current Version and the Next Version). In step 960 the controller 150 at retail system 822 receives the corrected Current Version and Next Version designations and stores the data.

In step 970, based on the corrected Current Version and Next Version designations received in the error message sent at step 940, the retail system 822 determines that one or both of its PPFs 840, 841 are out of date. The retail system 822 then sends a request to download the new PPF. For example, if the PPF 840 Current Version data is updated from "031001" to "031002," the retail system 822 will request the server system 800 to send an updated PPF version 031002, which will be saved as the Current List 840. In step 980 the server system 800 sends the requested list or lists to the retail system 822, where it is stored at the controller 150 level in step 990. After step 990, the method 900 returns to step 970, where the Current List 840 is used to perform product filtering. The method 900 continues as a loop, with the retail system 822 sending the Current Version and Next Version data to the server system 800 to continually verify that the PPFs 840, 841 are the correct versions.

In one embodiment, the message headers for communications sent from the server system 800 to the retail store system 822 could also contain Current Version and Next Version data, which would act as a confirmation of the Current Version and Next Version data. Most frequently, the Next Version data will change when the server system 800 generates a new PPF to be implemented in the future. This will preferably occur during off-peak hours, such as between midnight and 3:00 AM.

Figure 10:
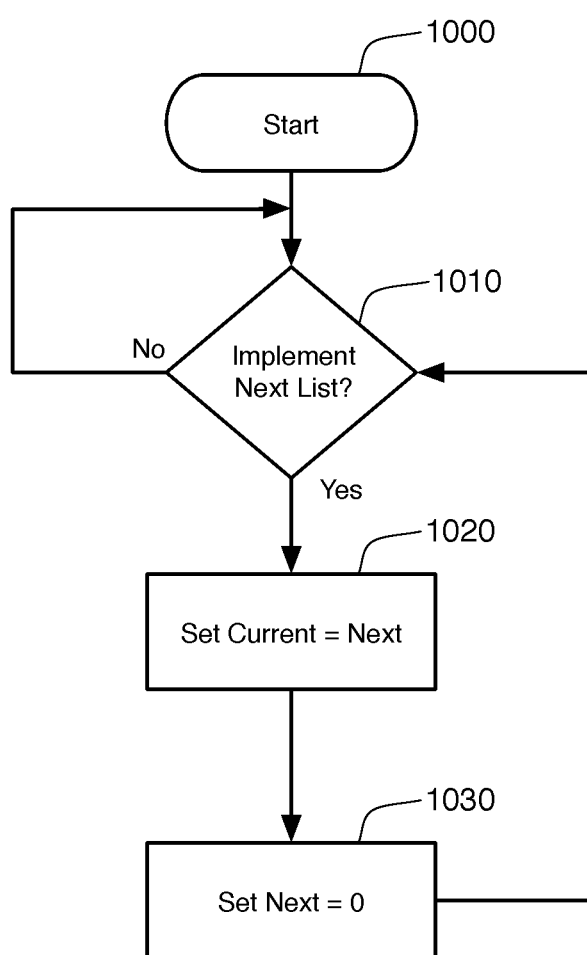
FIG. 10 is a flow chart showing a method for implementing a promotion product filter.

FIG. 10: Method for Choosing PPF Version

In FIG. 10, a method 1000 is presented for determining a PPF version for a retail store system 822. The method can be performed entirely at the retail store system 822. The retail system 822 preferably has a current PPF 840 and a next PPF 841 saved at the retailer system 822. Each PPF 840, 841 contains data indicating a time period during which the promotions in the PPF 840, 841 are valid. At the beginning of the method, the PPF 840 is the Current List of promotions, and the PPF 841 is the Next List, to be implemented at a future date. In step 1010, the system determines whether the Next List 841 should be implemented. This could be accomplished by reading expiration date information from the PPF 840, or by reading start date (or "effective date") information from the PPF 841. In one embodiment, the retail system 822 could use the dates in Current Version and Next Version data for the PPFs 840, 841 to determine whether to implement the Next List. For example, the Next List 841 may be implemented at midnight on a date specified by the Next Version data.

After step 1010, in step 1020 the Next List is redefined to become the Current List. The PPF 841 becomes the Current List and the PPF 840 becomes an expired list that will no longer be used by the retail system 822. If the retail system 822 does not have any additional stored PPFs, there will not be a Next List. In this case, the Next List is set to null at step 1030. In one embodiment, after step 1030 the retail system 822 may send a request to the server system 800 to download a Next List, if such a list is available.

Because the next version PPF 841 is always present and current at the controller 150 level, methods 900 and 1000 allow the retail store system 822 to operate with the correct PPF even when a network connection cannot be established. Even without a network connection, the retail store system 822 would seamlessly begin to use the stored next PPF 841 at the expiration time of the current PPF 840. It would be a simple matter to alter method 900 to allow three PPFs to be downloaded at each connection to allow the retail store system 822 to survive longer time periods without connection to the PPF Server 110.

FIGS. 11 and 12: Promotion Definitions

FIG. 11 shows a table 1100 of data defining different promotions for a program. With reference to FIG. 6, the promotion definitions 644 may be stored in a database 640. Each individual promotion record 644 contains detailed information about the promotion. For example, an individual promotion record 644 contains information about the product or department to which the promotion applies, activation and expiration dates, the discount type and variation, discount value, purchase requirements, the program or group receiving the promotion, the promotion sponsor, the retailers that will accept the promotion, and other such information as will be described.

Each promotion 644 will be applied to at least one program 642. As explained above, a promotion 644 may apply to all members 656 in a program 642, or the promotion 644 may only be available to members 656 who belong to a particular group 650 within the program 642.

The promotion 644 must have a discount type, which may be either a percent discount or cents off discount. The discount type is associated with a discount value, such as 10% or $0.50. A percentage discount type may also have an associated NTE ("not to exceed") value that caps the dollar amount that the promotion 644 can provide to the member 656. The discount may also be associated with a final price, which is the maximum product price that a customer will pay. For example, the promotion 644 may offer a particular product 646 for $0.99. This final price is the maximum amount that the member 656 will be charged for the product 646. Competitive systems cannot offer this type of discount since competitive systems do not provide real-time point-of-sale messaging that supplies the necessary data that allows the central server to calculate a price point discount on the fly.

Each promotion database entity 644 includes data that defines the benefits available for this promotion. The available benefits are defined by a benefit type (e.g., units or dollars) and a value that indicates either how many units the discount can apply to (e.g., discount can be used on up to three units of a product), or a maximum dollar amount to apply (e.g., up to $5.00). The benefit available data also includes a duration, which is used to determine, upon redemption, if a remaining benefit should expire at the close of a transaction or should continue to be available throughout the defined effective period until exhausted (which ever happens first). If the benefit is available for a specified time period, the promotion 644 can be used across multiple retailers 666 accepting the program 642. The duration may also be a multiple number of uses, such as that the particular promotion 644 can be used three times. The duration could also be defined to allow multiple uses within a set time period, such as two discounts per visit (or per day, per week, etc.). In the preferred embodiment, two or more different time periods can be used to define the number of times the promotion can be used. For example, the promotion may allow only one discount per transaction, but up to three discounts per week (or two discounts per transaction, up to ten discounts per month). When a customer uses a promotion 644, this use is stored in the benefit database entity 654 and compared with the benefits available for the promotion 644 to see if the customer still has unused benefits associated with the promotion 644.

The promotion 644 also includes purchase requirements that must be met to qualify for the promotion 644. The purchase requirements will include a product identifier or department identifier. A purchase requirement type such as number of units or dollars is associated with a purchase requirement value, for example 3 units, or $10.00. A purchase requirement duration specifies the timing in which the promotion 644 is available. For example, if the purchase requirement duration is equal to "transaction," the member 644 must fulfill all of the purchase requirements in a single transaction in order to receive the promotion discount. Alternatively, the purchase duration could be a time period, which aligns with the assigned activation and expiration dates for the promotion 644. In this case, a member 656 could fulfill a purchase requirement over the time period and still receive the discount.

In one embodiment of the system, each product 646 associated with a promotion 644 is identified as a primary product or secondary product. This categorization is used if a promotion 644 has a purchase requirement such as buying one type of item and receiving another type of item for free. To avoid ambiguity, the "tie-in" product is the product that must be purchased, and the discounted product is the product receiving the discount. For example, a promotion 644 could support a "mix 'n' match" promotion where a member 656 must buy a certain number of tie-in products, after which the member 656 can receive a discount on a different discounted product. For example, this could be implemented in a promotion 644 in which a member 656 must buy three boxes of a particular brand of cereal (the tie-in products), after which the member 656 receives a gallon of milk (the discounted product) for free. If the purchase duration requirement is a time period, the member 656 may buy the secondary products during a first transaction, and receive the discount on the primary product during a subsequent transaction, which could be at the same retailer or a different retailer.

FIG. 12 presents a method 1200 for identifying the various elements of a promotion that may be defined and applied to purchased products using the present invention. The method 1200 starts with selecting a particular discount type at step 1210. FIG. 12 shows four different possible discount types: a money off type 1212 (such as a discount of $0.50 off the purchase price), a percentage off type 1214 (such as 10% off the purchase price), a final price type 1216 that specifies the exact price that the customer will pay (such as two items for $5.00), and a purchased additional value type 1218 (such as a promotion where a customer can pay $20 to obtain $40 worth of an item). Purchased additional value promotions are described in more detail in connect with FIG. 13 below. Note that free items can be considered the same as a 100% off promotion type 1214. In addition, some promotions may provide stored value of a set dollar amount that can only be spent on a certain item (such as $10 per month on fresh fruits and vegetables). These stored value type promotions are also considered a 100% off promotion type 1214, which is limited by a particular monthly cap as described below. Choosing the discount type in steps 1210-1218 involves selecting not only the actual type for the discount (such as a money off discount 1212), but also the value of the discount (such as $2 off).

Once the promotion's discount type is chosen, step 1220 defines purchase requirements for the promotion. One potential purchase requirements is a minimum purchase requirement 1222, such as a requirement that two items be purchased before a discount will be given on those items. This purchase requirement 1222 may also simply specify that at least one item must be purchased before the discount will be given on the item, which would be an obvious minimum requirement for most promotions. A second purchase requirement is a minimum dollar (or other currency) purchase requirement 1224, such as a requirement that $10 of an item be purchased before the promotion's discount will be given to a customer.

The third purchase requirement shown in FIG. 12 is a tie-in requirement 1226. An example tie-in promotion may require the purchase of one product (the trigger product) before a discount (say 25% off) is available on another product (the discounted product). In some circumstances, the trigger product is purchased in the same transaction as the discounted product. In other circumstances, the trigger item or items may be purchased in one transaction, and the discounted item may be purchased in another, later transaction. In this case, the promotion analysis server 120 can save the fact that the trigger item has been purchased in its database 640. When analyzing a later transaction, the promotion analysis server 120 will recall the fact that the trigger item or items meeting the tie-in requirement 1226 have already been purchased by this user from the database 115. This will allow the server 120 to make the promotion's discount available to the discounted product purchased in that later transaction.

A "redeemed previous promotion" requirement 1228 requires that a customer redeem a first promotion before that customer is eligible for a different, second promotion. This purchase requirement 1228 allows the system 10 to offer loyalty programs with evolving discounts to frequent purchasers of an item. For example, the manufacturer of a product may wish to offer a customer a large discount on their product in order to get the customer to try the product. The manufacturer may not want to give the same consumer such a large discount on the second and subsequent purchases of the item, because the user has already tried the product and may already be likely to re-buy the product. Nonetheless the manufacturer does wish to offer a continuing discount to the new customer to encourage the purchase. For instance, the manufacturer may offer a $5 off discount on a product, but only for the first purchase made by that customer. The second and third purchases would be given a $2 off discount, while all subsequent purchases would be granted only $1 off per purchase. This type of loyalty program can be implemented using the redeemed previous promotion purchase requirement 1228. The first promotion for $5 off can be a one-time use promotion for each user. The second promotion for $2 off could be triggered using the redeemed previous promotion purchase requirement 1228. Once the first promotion is redeemed, the second promotion is made available. The second promotion may have a two-use lifetime cap. A third promotion offering a $1 discount would have a requirement that the second promotion be redeemed twice by the customer before the third promotion is available.

Step 1230 allows a promotion to describe an applicable time frame for the selected purchase requirements 1220. The technique of storing information about purchases of trigger products and discounted products in database 640 allows a user to accumulate purchases of a product over multiple transactions in order to meet the purchase requirements 1220 for a promotion. For instance, a promotion's purchase requirement 1222 may grant a user a free item after the user has purchased five of the item at full price. A user may elect to buy all six items in the same transaction in order to qualify for the free item discount. Alternatively, the five purchases may occur over four prior transactions. When the user purchases the sixth item, the promotion analysis server 120 will be able to identify the five prior purchases of the item, and the promotion will grant this sixth item to the user for free. Any of the purchase requirements 1222-1228 can be assigned a time frame 1230 during which the requirement must be met. For example, a promotion with a tie-in restriction 1226 may grant the user a free item after the user has purchased $50 of a different item. The time frame 1230 for completing a purchase requirement 1220 may be, for example, a single transaction, a week, a month, a calendar year, or even an unlimited time duration.

Because the server system 100 storing the prior purchase information of customers is accessed by a variety of retailers (such as retailers 820, 830), it is possible that the discounted transaction will occur at a different store, or even a different retailer, than the transaction or transactions in which the trigger items were purchased. If the transactions were analyzed and discounts were calculated at the retail store system 130 level, then information about prior transactions that occurred at a different, competing retailer would not be available for the purpose of determining discounts. In some cases, such as when a retailer is itself the sponsor of a promotion, the purchase requirements 1220 for a promotion can be limited to purchases made only at one retailer, or even at a single retail store location. In contrast, a promotion sponsored by a product manufacturer would be happy to have purchases made at any retailer satisfy the promotion's purchase requirements 1220. Consequently, the designation of a promotion requirement 1220 can indicate the type purchase requirement 1222, 1224, 1226, 1228, specify the products needed to meet the requirement 1220 and the time frame 1230 during which the requirement can be met, and also the retail location where the products need to be purchased.

Step 1232 recognizes that some promotions will have multiple purchase requirements 1220. For example, a promotion may offer $2 off of two jugs of milk after the customer has purchased two boxes of a manufacturer's breakfast cereal. The breakfast cereal requirement is a tie-in purchase requirement 1226, and the requirement that the user purchase two jugs of milk is a minimum purchase requirement 1222. Because a tie-in requirement 1226 will usually require both the purchase of the trigger products and a minimum purchase of at least one (requirement 1222) of the discounted products, most tie-in promotions will be considered to have two purchase requirements in the conceptual framework of method 1200.

Once all of the purchase requirements 1220 are defined for the promotion, it is necessary to specify any caps on the use of this promotion. As explained above, the database 640 tracks benefits 654 to determine whether a household 652 has any benefits remaining in a time period for a particular promotion 644. Some promotions may not need to track benefits. For instance, a promotion may offer 5% off an item without any limits as to the number of items that may be purchased or the frequency of purchases. Other promotions may have a dollar cap, which may be refreshed every time limit. For example, a promotion may provide for 20% off of fruits and vegetables, with a maximum discount of $10 in any calendar month. The benefits data 654 will track how much of this $10 maximum discount is left for this user in a given month. If only $2 remains of this maximum discount, the promotion analysis server 600 will grant the user at most $2 for this promotion. This benefit would then be automatically reset at the beginning of the next month. The benefit limit may also relate to the number of discounts provided, as opposed to a particular dollar amount. For instance, a promotion may provide only a single discount in any particular transaction, but may allow a user up to three discounts per week. Another promotion may offer up to two discounts per transaction, six discounts in any week, and up to twenty discounts in a month. A third promotion may be limited to a single use, never to be repeated for that customer.

Step 1240 allows these benefits and caps to be defined as part of the promotion. The first type of cap is a not-to-exceed cap 1242, which indicates the upper limit of a single application of a promotion. For instance, a 50% off a half-gallon of milk discount may cap the discount at $1.50. If the milk costs less than or equal to $3, than the full 50% off discount will be provided. If the milk costs more than $3, then the not-to-exceed cap 1242 will limit that discount to $1.50. Because a not-to-exceed cap 1242 limits the amount of a discount but does not track whether a promotion is "used up", it is not necessary to track or renew benefits 654 in the database 640 for this cap 1242. As a result, step 1250 (which defines the benefits renewal period) is skipped for this type of cap 1242.

Benefit limits or caps 1244, 1246 limit the number of units or the monetary amount of discounts that can be provided within a time period. The time period could be defined as a single transaction, or a specific time period such as a day, week, or month. These types of caps 1244, 1246 are designed to provide a limit for a time period. In some circumstance, a promotion can be defined so that the benefits will automatically renew at the next time period. This time period and any restrictions on the renewal are defined at step 1250. The method 1200 is designed to allow for multiple caps 1240 on a single promotion, so step 1252 allows for more caps 1240 to be added. In this way, a 25% off fresh fruits and vegetable promotions can indicate that no more than $5 can be discounted in a single day, and no more than $25 can be discounted in any calendar month. If no caps 1240 are to be placed on a promotion, then step 1248 is selected (no cap), and steps 1250 and 1252 are skipped.

Once the discount and discount type 1210 are specified, the purchase requirements 1220 are defined, and the benefit caps 1240 are identified, the promotion definition is complete. The promotion is then saved as database entity 644 in step 1260, and the method 1200 is complete.

Figure 13:
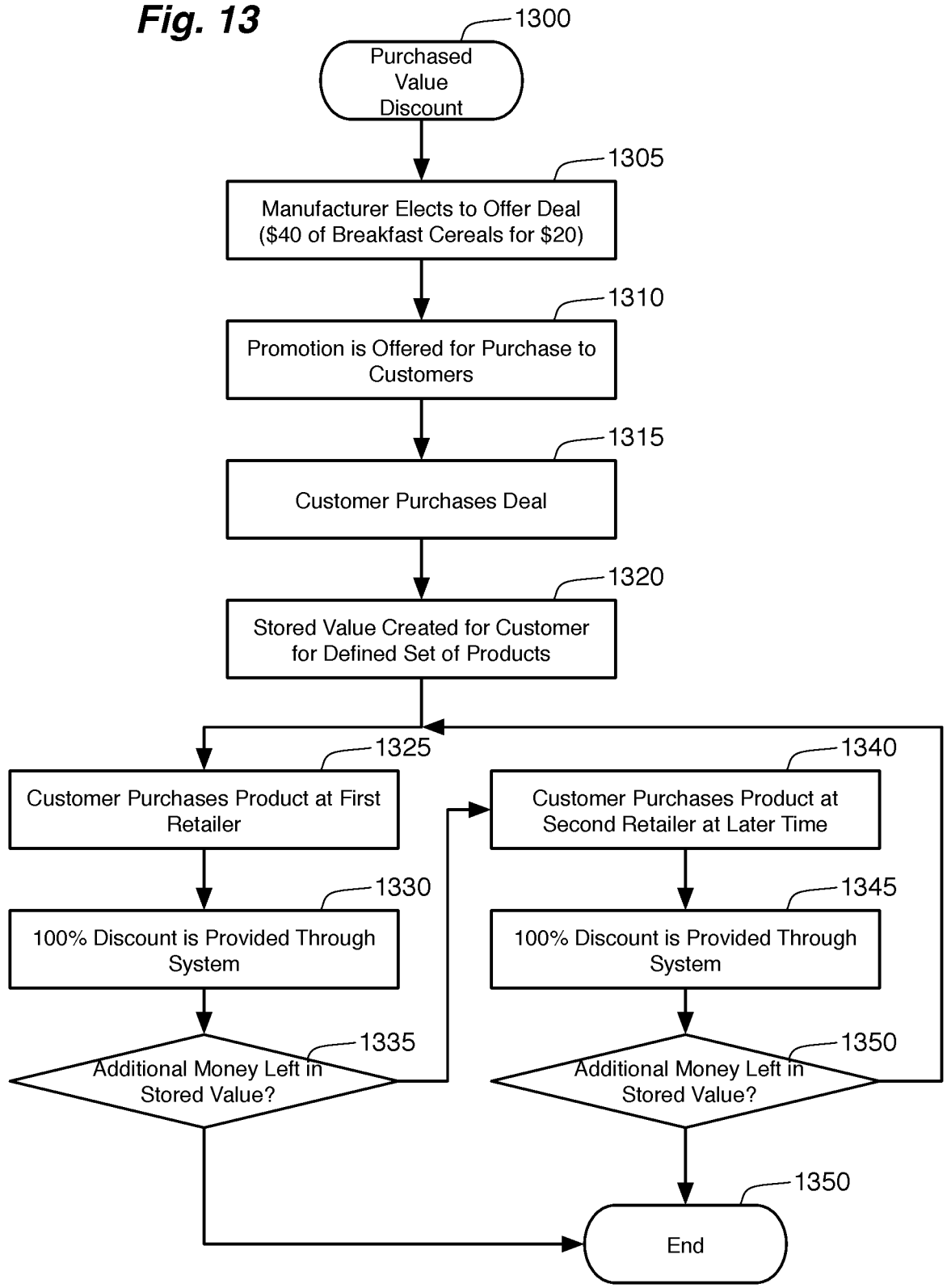
FIG. 13 is a flow chart showing a method for handling purchased value discounts over multiple transactions across retailers.

FIG. 13: Purchased Value Discount

FIG. 13 shows a particular method 1300 that is used to provide a multi-retailer, multi-transaction purchased value discount 1218. Purchased value discounts 1218 are similar to the purchased value coupons provided by entities such as Groupon (Chicago, Ill.). One difference, however, is that purchased value coupons are sponsored by an individual retailer or service provider, and are redeemed during a single transaction with that sponsoring retailer. In contrast, the purchased value discounts 1218 can be sponsored by a product manufacturer, and can be redeemed across competing retailers and through multiple transactions. The method 1300 starts at step 1305 with a manufacturer electing to offer a deal and arranging with the administrator of the server system 100 to define a promotion of type 1218. For example, the manufacturer of a breakfast cereal may offer a deal of $40 of breakfast cereals made by that manufacturer for $20. The purchase price, the total provided discount, and the time duration of this promotion are all defined in the promotion entity 644 in the database.

This promotion is then offered for purchase to customers in step 1310. These customers may be customers that are already using the system 10, or be customers that are new to the system 10. In some embodiments, these promotions are only made available to customers that are already members of an existing program. When the customer purchases the deal at step 1315, the promotion is made available to the customer in the database 640. The promotion database entity 644 would be assigned to the program 642 of those members 656 eligible to participate in the promotion. By linking the promotion 644 and its benefits 654 to the member 656, the system is effectively creating stored value in the system 10 for the customer to spend pursuant to the terms of the promotion. This value is paid for by the sponsor of the promotion, such as the cereal manufacture in the current example. The server system 100 would then provide free products up to the specified value to those customers that purchased the promotion.

If the promotion is made available to customers who are new to the system 10, their information would be added to the database 640 and a user card 144 or other identification means would be provided to the customer. This card would then be associated with a new program 642 created for providing these types of promotions to customers.

At step 1325, the customer purchases products under the promotion at a first retailer. Using the system 10, the retailer submits the filtered product list to the server system 100, and a 100% discount on the product is applied up to the total value of the promotion ($40 in the current example). If additional money is available under the promotion, the customer can then go to a different, competing retailer and purchase additional product at a later time at step 1340. Again, the retailer store system 130 of the second retailer will submit the purchase to the server system 100 and the customer will receive a 100% discount up to the unused value of the promotion. If additional money remains in the promotion, the customer may continue to make purchases and receive discounts until the entire $40 value of the promotion is used, at which time the process ends at step 1350.

In some cases, the purchased value discount promotion has a time limit. When this time has passed, the bonus portion of the promotion value beyond what has been paid by the customer is lost. In the current example, the value of the promotion would be reduced from $40 to $20 upon expiration of the promotion. If the customer had already used between $20 and $40 dollars, then no additional benefit would remain upon expiration.

Figure 14:
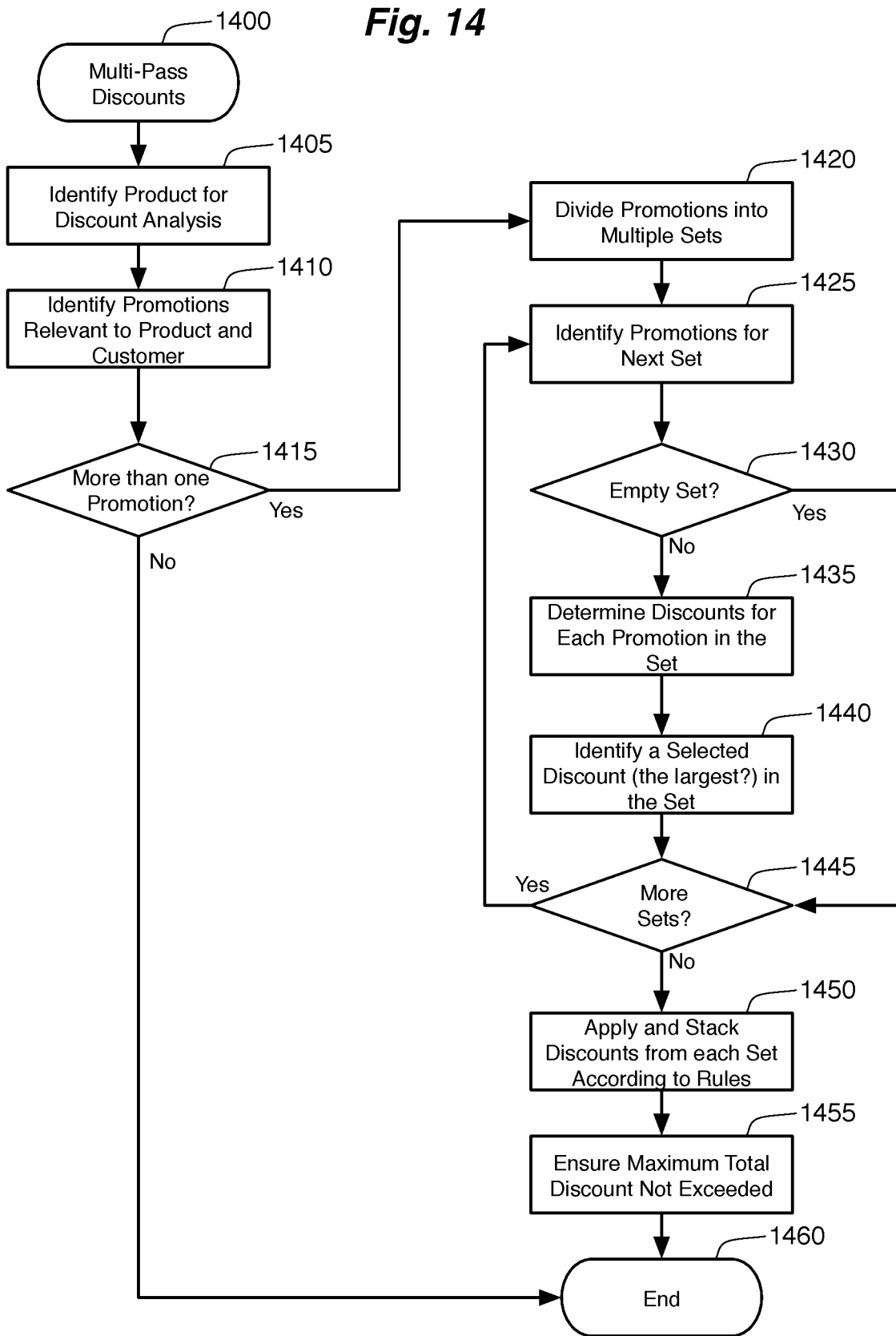
FIG. 14 is a flow chart showing a method of using a multi-pass rule set to apply multiple promotion discounts to a single product purchase.

FIG. 14: Multi-Pass Discount Rule Set

FIG. 14 shows a method 1400 for using a multi-pass rule set to determine which promotion discounts should apply to a product. The purpose of the multi-pass method 1400 is to divide multiple promotions that may apply to a product into a variety of sets, select a single promotion from each set, and then stack the selected promotions to the product so that multiple promotions can be applied to the purchase of a single product according to the requirements of a predetermined rule set.

The method begins at step 1405, where the server system 100 identifies a particular product in the filtered product list for discount analysis. While the following description of method 1400 discusses an individual product, it is to be understood that the "product" may be multiple products that have been grouped together in the filtered product list. The filtered product list is the same list that was transmitted by the retail store system 130 at step 230. At step 1410, the server system 100 uses the customer identifier to determine which promotions are relevant to this customer. This step 1410 could be accomplished in the same manner described above in connection with steps 240 and 242 of method 200. This step 1410 may also determine which promotions still have benefits remaining to the customer, so that promotions that have no remaining benefits are not considered further in this method 1400. At step 1415, the promotion analysis server 120 determines whether multiple promotions apply to this selected product. If not, there is no need to apply the multi-pass discount rule set to these promotions, as the single promotion can simply be applied to the product. As a result, if there is only a single promotion, the method 1400 will end (step 1460).

At step 1420, the plurality of promotions is divided into multiple sets using pre-established criteria. In one embodiment, the promotions are divided according to the sponsoring or paying party. In this way, each set will have only a single sponsor, and all of the sponsor's promotions will be found in a single set. For example, the promotions could be divided as follows:

Promotions paid for by an insurer that created a program and sponsors promotion-level promotions for their insureds:

Promotions paid for by an employer that sponsors group-level promotions for their employees within the insurer program; and Promotions paid for by a retailer that sponsors retail-level promotions for the insureds shopping in their retail stores.

In a second embodiment, step 1420 divides the promotions by discount types. For example, the promotions could be divided in this manner:

Percent-off promotions 1212;

Money-off promotions 1214;

Final price promotions 1216; and

Purchased Value promotions 1218.

In this type of division, further distinctions could be made between different percent-off promotions, with free items being treated differently than less than 100% reductions.

A third method of dividing promotions into sets relates to the purchase requirements of the promotions. For example, the promotions could be divided into the following sets:

Promotions requiring only that an individual product be purchased;

Promotions requiring multiple purchases of the discounted product;

Promotions requiring the purchase of tie-in products; and

Promotions that are part of a loyalty program or require the prior redemption of a different promotion.

In a fourth embodiment, the promotions could be divided by how the promotions are assigned to products. This type of division may divide promotions between:

Product-level promotions (defined by an individual UPC or PLU);

Product group-level promotions (where multiple products are group together in a PPF);

Department level promotions (defined by a retail store's department code); and

Entire transaction discounts (discounts that apply to a transaction total regardless of the products purchased in the transaction).

It is to be understood that these four described embodiments are merely exemplary, and an actual implementation may select one of the embodiments, may combine or subdivide the sets in any embodiment, or may combine sets from different embodiments in order to meet the needs of the system 10. For example, a preferred embodiment defines a product group around fresh fruits and vegetables, and then divides promotions as follows:

Money off and percent off promotions on unrelated to the fresh fruits and vegetables product group;

Money off and less-than-100 percent promotions on products within the fresh fruits and vegetables product group;

100% off promotions on products within the fresh fruits and vegetables product group (typically this is a stored value that is refreshed monthly, such as $20 per month of free fresh fruits and vegetables); and Any other promotions, including stored value amounts that apply to product categories in addition to or instead of fresh fruits and vegetables.

Once the promotions are divided into multiple sets in step 1420, all the promotions that fit within the first set are considered at step 1425. Assuming that relevant promotions do exist within this set, as determined by step 1430, the discounts on the product are then calculated for each of these promotions at step 1435. These discounts are then compared and analyzed in step 1440 to select a single promotion from the set to apply to the product purchase. The selection process in step 1440 can be as complex as desired. In a simple embodiment, this step 1440 simply selects the promotion with the largest discount value. For example, if a single product is eligible to receive either $1.00 off the product or 10% off the product in the same promotion set, the greater discount will be applied. Next, at step 1445, the method 1400 determines if there are other sets of promotions that need to be analyzed. If so, the method returns to step 1425. Step 1445 is also performed if step 1430 determines that a promotion set contains no promotions relevant to this product.

Once all the promotion sets are analyzed, the selected discount for each promotion set are applied to the product in step 1450. In the preferred embodiment, these promotions are applied according to a predetermined rule set. For example, FIG. 14 shows that at step 1455 the method 1400 ensures that a pre-determined maximum total discount for a product cannot be exceeded. In most cases, it is important that a customer does not acquire a product less-than-free; otherwise the retailer would end up paying the customer to purchase the product. To ensure that this does not happen, the price paid for the product, minus any applied POS coupons, is compared to the total value of discounts to be applied in step 1450. If the discounts exceed the price paid, less than all of these promotions will be applied in step 1450. In one embodiment, the promotions are applied in the same order as the promotions are analyzed in steps 1425-1445. Once the product is reduced to free, no additional promotional discounts will be applied. The rule set may impose other or alternative rules, such as requiring that a total transaction is never reduced to no lower than 10% of its original price. The process 1400 will then end at step 1460

Figure 15:
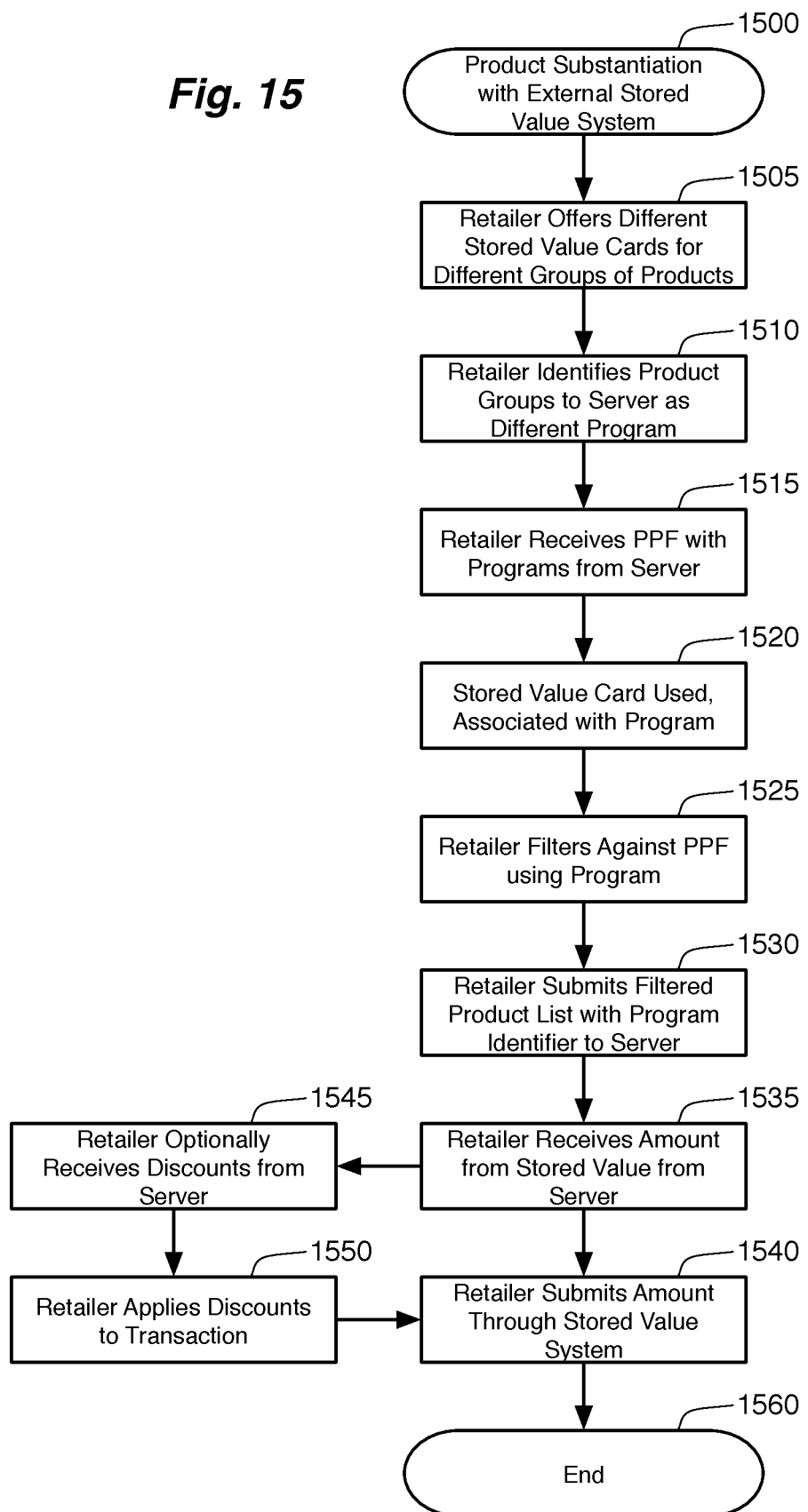
FIG. 15 is a flow chart showing a method of product substantiation using an external stored value card network for payment.

FIG. 15: Product Substantiation with External Stored Value System

FIG. 15 shows a method 1500 for using the system 10 to substantiate purchases for an external stored value system. For instance, a retailer may wish to offer a gift card that can only be used only for baby supplies, which can be used as a gift for a new mother, or a gift card that can only be used for toys that could be given to a child on a birthday. The retailer may have an established stored value or gift card system in place that maintains gift card balances and handles gift card transactions. The system 10 can be used to supplement this established gift card system to ensure that the card is only being used on the designated products.

The process 1500 begins with a retailer offering a stored value card that is restricted to a particular group or groups of products in step 1505. The retailer must establish these products as part of a program (as described above in connection with FIG. 7) with the operator of the server system 100 in step 1510. The PPF Server 110 will then include the program in the PPF that is provided to the retailer's systems 130 in step 1515.

When a customer uses the gift card in step 1520, it is important that the retailer extract the stored value card number from the card in order to access the stored value account. In addition, the retail system 130 must also understand that this gift card is restricted and subject to substantiation under this method 1500. One technique for associating a gift card with a particular restricted purchase program is to create a unique subset of gift card numbers for this purpose. When this technique is used, the retail system 130 can determine the appropriate program in a PPF simply be evaluating the card number taken from the stored value card. In this embodiment, software operating on the retail store system 130 will evaluate the stored value card number, identify the program, and initiate the product substantiation using the correct program. Alternatively, the gift card can have encoded on it a separate number associated with the program. For instance, the card could encode a standard stored value card number on a mag stripe, and also encode the substantiation program number (and user ID on an optically readable bar code. In still other embodiments, both the stored value card number and the substantiation program number are encoded together, such as on a single mag stripe or a 2D bar code.

Regardless of the embodiment, the retail store system 130 will understand that the presented gift card can only be used on restricted products and will be able to identify the program associated with this card. The retailer's controller 150 will filter the products that the customer is purchasing against the PPF for this program in step 1525. The retail store system 130 will then submit the filtered purchased product list to the server system 100 for substantiation at step 1530. At this point, the server system 100 will identify the products associated with the program and return the value of those products to the retail store system 130 in step 1535.

The identification of a program for a customer, the product filtering, the submission of the filtered purchased product list, and the analysis at the server system 100 in method 1500 can all be performed in a manner similar to that described above in connection with method 200. The one key difference is that the server system 100 in method 1500 does not credit the retailer's account, as the retailer will not receive reimbursement through the server system 100. Rather, at step 1535, the retailer receives the value from the server system 100 indicating the amount of purchased products that are allowed under the program, and then submits a request for reimbursement of this amount through their standard stored value card system at step 1540. In this manner, the retailer is able to offer stored value cards to customers that can only be used on a particular group of products without having to alter its established stored value card system in any manner.

In one embodiment, the user of the stored value card may also be eligible for discounts on the products being purchased. This may be because the user also presented a user card 144 associated with another program along with the stored value card. The retail store system 130 will then use both the program associated with the user card 144 and the program associated with the stored value card to filter the products in step 1525. In this case, the retailer would receive both the amount to be deducted from the stored value card (step 1535) but also an indication of the discounts to be applied to this transaction (step 1545). The retailer would then apply these discounts to the transaction at step 1550 before submitting the payment request through their stored value card system in step 1540.

In an alternative embodiment, the retailer may itself provide discounts to customers using the stored value card. For instance, the toy related gift card that is purchased for $50 might allow the recipient to buy $50 of toys and make the recipient eligible for a 5% discount off the price of any toy purchased with the card as well. In this case, the PPF indicating the eligible products may not change, but the server system 100 would both calculate the applicable discounts and substantiate the total amount of toy purchases for reimbursement through the stored value card system. Ideally, the discounts would be applied before reimbursement is requested. The discounts associated with the stored value card need not be offered on exactly the same products that are eligible for purchase under the card. For instance, a food oriented gift card may be restricted so that it could only be used for food purchases, but in addition could offer a 5% discount on all other purchases made at the same time as a food purchase.

Figure 16:
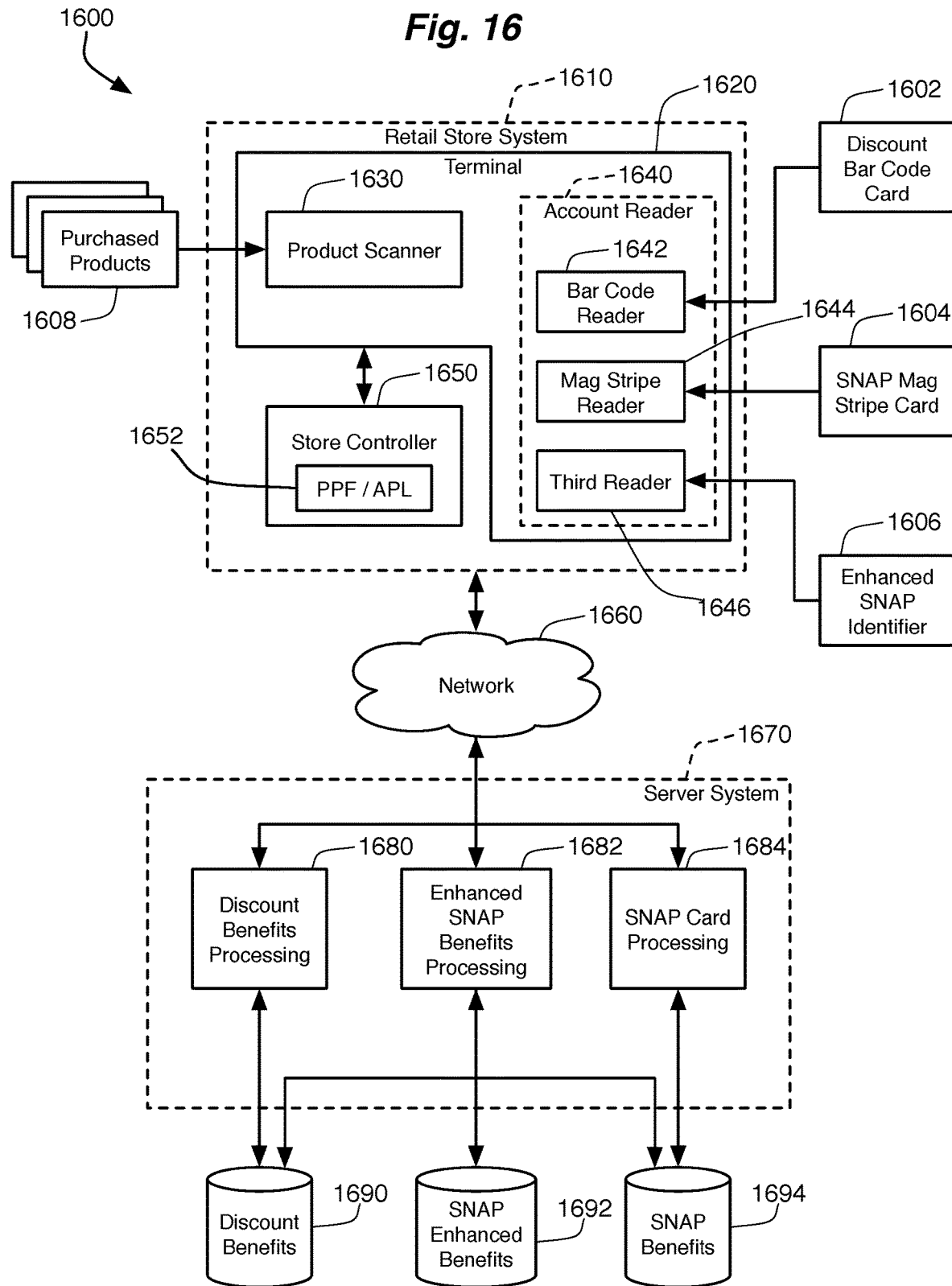
FIG. 16 is a system diagram showing the primary components of another embodiment of the present invention.
Figure 17:
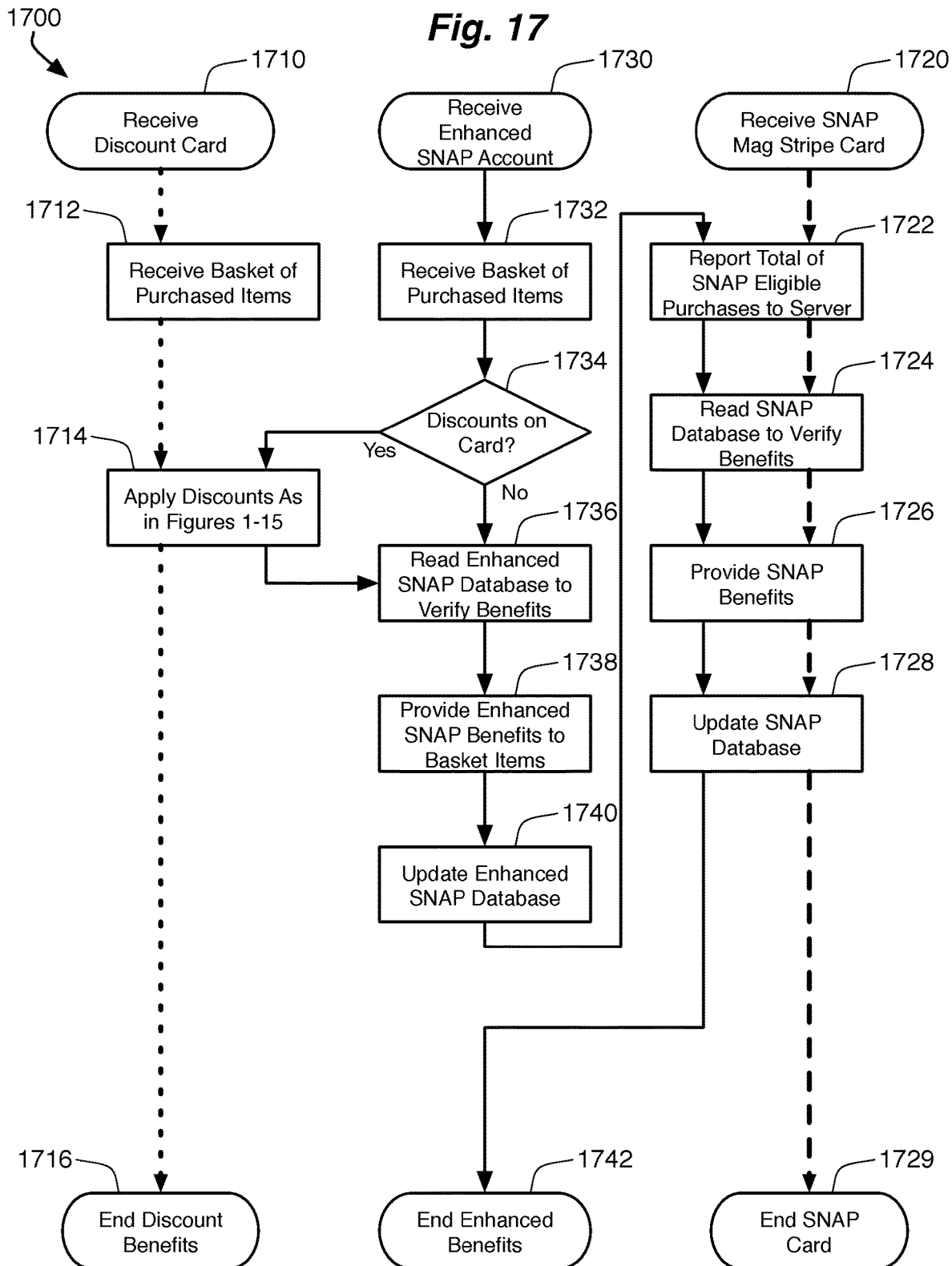
FIG. 17 is a flow chart showing a method to performing the embodiment of FIG. 16.
Figure 18:
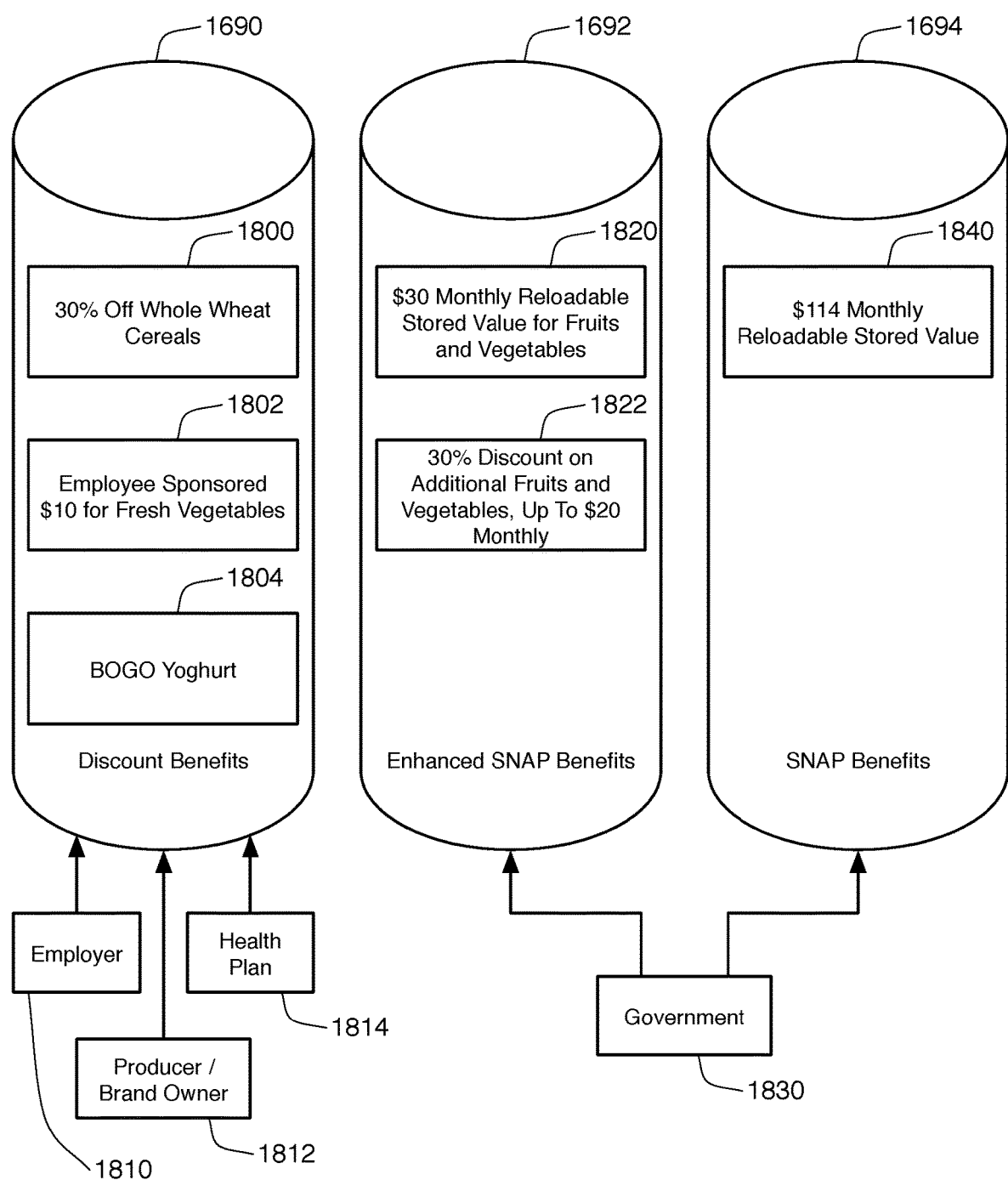
FIG. 18 is a schematic diagram showing benefit sources for the embodiment of FIG. 16.

FIGS. 16-18: Dual Redemption Paths for SNAP Program with Enhanced Benefits

The above descriptions describe a system and method for providing discount processing at a point of sale terminal 140 through the use of a remote server system 100, as shown in FIG. 1. The remote server system 100 stores information about promotions, creates a promotion product filter (PPF) list 152, and forwards that list to the retail store system 130. The retail store system uses that PPF list to filter a list of purchased products 142, and provides that filtered list in a "basket" to the server system 100. The basket contains a list of those products 142 purchased in a purchase transaction that are relevant to the promotions provided by the server system 100. The server system 100 uses this basket to compare promotions that are available to the customer (as indicated by the data in a database 115), applies available promotions to the basket to calculate discounts for the products 142, and returns the calculated discounts to the terminal 140 for discounting the items 142 during that purchase transaction.

The improvements to the retail store system 130 through the utilization of a server system 100 can be applied in the context of providing Supplemental Nutrition Assistance Program (or "SNAP") benefits to beneficiaries. SNAP, also known as Food Stamps, is a nutritional assistance program sponsored by the U.S. Federal Government and distributed by the individual states. Although each state has some control over the manner in which the SNAP benefits are distributed to individual beneficiaries, the Federal sponsorship of the program ensures that each of the state-managed programs have various factors in common. In each state, the SNAP program provides a monthly stipend that can be spent by beneficiaries on eligible food items. Eligible items are defined by the U.S. Department of Agriculture (USDA), and include fruits, vegetables, breads, cereals, dairy products, meats, fish, poultry, and other plants and seeds that are fit for consumption. SNAP benefits may not be spent on alcohol, tobacco, and non-food items.

The SNAP program differs from the Special Supplemental Nutrition Program from Women, Infants and Children (or "WIC") program in that WIC benefits can only be used on particularly defined food items (such as juice, milk, breakfast cereal, cheese, eggs, fruits and vegetables, whole wheat bread, and specific whole grain items). In the WIC programs, each item is given a maximum allowable cost, and systems implementing WIC programs frequently report specific purchases up to a server along with an item cost in order to obtain approval for use of WIC funds during a purchase. SNAP program implementations do not send information on specific product purchases to a central server. Retailers are authorized to submit SNAP benefit requests only for allowed food items, but they do not identify which items are being purchased as part of that benefits request.

SNAP programs are typically implemented with a magstripe electronic benefits transfer (or "EBT") card, on which is encoded a user's SNAP identifier. Although each state issues cards to its own residence, SNAP cards issued in one state are required to be useable by the beneficiary in all fifty states. It is therefore difficult to implement a unique program in one state if the benefits provided by that program are not immediately recognized and usable throughout the entire country.

From 2011 through 2013, Massachusetts participated in a Healthy Incentives Pilot (or "HIP") program. The HIP program was created in the 2008 Farm Bill and designed to encourage healthier eating habits. This program offered SNAP recipients in Hampden County, Massachusetts a 30-cent incentive credited to their EBT card for every dollar of SNAP benefits spent on certain fruits in vegetables at certain retailers. The incentive was capped at $60 per household per month. Implementing this program required software changes to both the retailer systems and the servers that managed and maintained the SNAP benefits. Retailers in the pilot program redesigned their systems to identify both overall total SNAP purchases in a transaction, and the total purchases of products in the HIP program to the server system. In particular, retailers need to maintain their own lists of HIP-eligible items. When new HIP-eligible items were added to a retailer's inventory, they had to be separately flagged so that they could be identified by the retailer's system and properly reported to the server system. Under this pilot program, retailers would separately report HIP allowable purchases to the server system so that the incentives could be calculated and awarded, but no item identifiers or other basket information was provided to the servers. In most cases, the checkout process remained unchanged, as the additional processing was handled by the retailer's point-of-sale systems.

FIG. 16 shows a system 1600 that utilizes the processes described above in connection with discount processing to improve the handling and redemption of SNAP benefits. Similar to the system 10 shown in FIG. 1, system 1600 utilizes a retail store system 1610 that has both a terminal 1620 and a store controller 1650. The retail store system 1610 communicates with a server system 1670 over a network 1660. The physical construction of these elements 1610, 1620, 1650, 1660, and 1670 are similar to that describe in connection with the same elements in system 10.

The terminal 1620 includes a product scanner 1630 and one or more account readers 1640. The account reader 1640 is designed to read account information from cards or mobile devices presented by customers. The account reader 1640 may include one or more of a bar code reader 1642, a magnetic strip reader 1644, or any other type of reader 1646 such as a NFC reader for reading payment and related wireless communicated information from mobile devices. In some embodiments, the product scanner 1630 is able to scan optical bar codes from a user identification card, allowing the product scanner 1630 to also function as an account reader 1640.

A user may present one or more types of identification to identify themselves to the system 1600. For example, a user may have a bar code encoded card 1602 (similar to user card 144) that identifies the user to the bar code reader 1642 as a participant in a discount/promotion program as described above. The user may also have a magnetically encoded SNAP card 1604 that is read by the mag stripe reader 1644 of the terminal 1620. The SNAP mag stripe card 1604 identifies the user as a beneficiary of the SNAP program. The user may also have another card or mobile device that provides an enhanced SNAP identifier 1606 to the third reader 1646, which identifies the user as a beneficiary of a SNAP program that provides enhanced benefits. In some embodiments, a user having an enhanced SNAP identifier 1606 would also carry a standard EBG mag stripe card 1604, as explained in more detail below. In these cases, the identifier 1606 may be the same account number that is encoded into the SNAP mag stripe card 1604.

System 1600 can be used according to the processes 1700 described in the flow chart shown in FIG. 17. As shown in FIG. 17, the process flow will differ depending upon whether the user presents a discount bar code card 1602 (step 1710), presents a SNAP mag strip card 1604 for standard SNAP processing (step 1720), or presents an enhanced SNAP number 1606 (step 1730). When a user presents a discount bar code card 1602 during the purchase of one or more products 1608, the terminal 1620 will scan the card 1602 with reader 1642 and also scan the purchased products 1608 with the product scanner 1630. The store controller 1650 will then compare the purchased products against a PPF list 1652 that it had earlier received from the server system 1670, and then send the filtered list to the server system 1670. Each of these steps has been described in detail above, and are shown together in FIG. 17 as step 1712. Note that the processing of these discounts upon presentation of card 1602 is shown through dotted arrows on FIG. 17. The server system 1670 will then perform discount benefits processing 1680 on the purchase, while accessing and updating a database related to discount benefits 1690 that is accessible to the server system 1670.

FIG. 18 shows a schematic representation of the promotions 1800-1804 that are managed and tracked by the discount benefits database 1690. In this example, the database 1690 contains a 30% off whole wheat cereals promotion 1800, an employee sponsored $10 stored-value benefit that an be spent on fresh vegetables, and a buy-one-get-one offer on Yoghurt. As explained above, these promotions 1800, 1802, 1804 can be sponsored (paid for) by different sponsoring entities, such as the card owner's employer 1810, the producer or brand owner for the product 1812, and a health insurance plan 1814 that is ensuring the consumer.

The promotions 1800-1804 are evaluated for availability and compared against the basket of purchased items reported by the retail store system 1610. Discounts are then calculated for the purchased products 1608 using these promotions 1800-1804. These discounts will then be reported back to the terminal 1630 and applied to this purchase transaction. The discounts benefits processing 1680 and the utilization of the promotions/discounts database 1690 are described in detail above, and are shown together as step 1714 in FIG. 17. The handling of the purchased products 1608 using the discount card 1602 then terminates at step 1716.

If the user presents a SNAP mag stripe card 1604 (step 1720), then the retail store system 1610 and the server system 1670 will handle the purchasing of products 1608 through existing, well-known SNAP benefits processing procedures. More particularly, the retail store system will identify which of the purchased products 1608 are eligible for SNAP benefits, and report this amount and the SNAP account identifier to the server system 1670. The retail store system 1630 will not identify any particular purchased product (i.e., will not send a basket of relevant item identifiers) to the server system 1670 as was done in step 1712 for discount processing. The server system will then undertake SNAP card processing (shown as box 1684) by accessing the SNAP benefits database 1694 to determine whether the user still has SNAP benefits available during the current time period (step 1724). The SNAP benefits database 1694 is shown schematically in FIG. 18. In this figure, the SNAP benefits available to the user is a single benefit of $114 per month that is usable for eligible SNAP food items. Each use of this benefit 1840 is tracked in the database 1694 so that a user cannot exceed this amount in any given month. As shown in FIG. 18, the government 1830 sponsors this benefit 1840, and reloads the benefit 1840 every month. If money is available in this benefit 1840, the server system 1670 will identify the benefits to the retail store system 1610 and the terminal 1620 will apply the benefit against the purchased products 1608 (step 1726). The SNAP benefits database 1694 will be updated at step 1728 to reflect the provided benefits, and the processing will end at step 1729. Note that the processing of the SNAP mag strip card 1604 is shown in FIG. 17 through dashed arrows.

The improvement of system 1600 and method 1700 lies primarily in the enhanced SNAP processing, which occurs when the terminal identifies an enhanced SNAP account identifier 1606 at step 1730. As explained above, this can occur by receiving an NFC or other wireless communication from a mobile device at reader 1646. In the preferred embodiment, this identifier is dynamic (constantly changing) and/or encrypted in order to prevent the identifier from being read by a malevolent party attempting to defraud the system 1600. Techniques for having a mobile device provide a dynamic identifier for payment transactions are well known in the prior art, as our secure encryption techniques for transmitting such identifiers. Alternatively, the mobile device may present a bar code on its display screen that can be read by a standard bar code reader 1642 (or event product scanner 1630). It is also possible that the enhanced SNAP identification number could be presented through a physical card containing a standard bar code or mag stripe that could be read by readers 1642, 1644, respectively. In one embodiment, the enhanced SNAP identifier is presented through a standard SNAP mag stripe card, and the differentiation between standard SNAP processing 1684 and enhanced SNAP benefits processing 1682 is based solely on the account identifier embedded on the card. In other words, the retail store system 1610 analyzes the account identifier and determines whether the account should be processed as a normal SNAP mag stripe card 1604 or as the presentation of an enhanced SNAP identifier 1606. If a card with an enhanced SNAP benefits number were presented at a retail store system 1610 that was not able to handle enhanced SNAP processing, the system 1610 would simply treat the card as it would a standard SNAP mag stripe card 1604.

After the enhanced SNAP account identifier has been received in step 1730, the retail store system 1610 will prepare a basket of item identifiers for the purchased products 1608 to send to the server system 1670 (step 1732). This step is similar to step 1712, in that the retail store system 1310 can send the entire basket (identifying all purchased products 1608) to the server system 1670, or retail store system can filter the basket against a PPF list 1652. In the preferred embodiment, a PPF list relating to enhanced SNAP benefits will be created by the server system 1670 and provided periodically to the store controller 1650. The generation, transmission, and updating of the enhanced SNAP PPF list can be accomplished in the same manner as described above in connection with discount processing. The items identified in the enhanced SNAP PPF list will include those items for which enhanced benefits are provided in the SNAP enhanced benefits database 1692. For instance, if the enhanced benefits related to fruits, vegetables, whole grain foods, and particular nutritional supplements, item and/or group identifiers for those foods and supplements will be included in the enhanced SNAP PPF list.

As explained above, the store controller 1650 is able to handle multiple PPF lists for different programs. Thus, the store controller 1650 may have one PPF list that is used to filter items for promotional discount processing 1680, and a separate PPF list that is used to filter items for enhanced SNAP processing. In the preferred embodiment, multiple programs 700, 750 relating to promotional discount benefits processing 1680 will be operable at the same time by the store controller 1650, with each program 700, 750 having a separate PPF list. Similarly, multiple enhanced SNAP benefits programs could be operable simultaneously, each with a different enhanced SNAP PPF list. In one embodiment, each state could provide different enhanced SNAP benefits, and the store controller 1650 would be able to successful manage the distinctions between these programs simply by identifying the PPF list 1652 that is appropriate for the provided enhanced SNAP number 1606.

In an embodiment described in more detail below, some enhanced SNAP numbers may be eligible for promotional discount processing 1680 in addition to the enhanced SNAP benefits. Step 1734 determines whether or not such discounts are available for the customer presenting the enhanced SNAP number 1606. Assuming that discounts are not available, the server system 1670 would then read the SNAP enhanced benefits available for the current user from the SNAP enhanced benefits database 1692 (step 1736). FIG. 18 shows an example enhanced SNAP benefits database 1692 that contains two benefits 1820, 1822 funded by the government 1830. The first benefit 1820 is an additional $30 monthly benefit that can be used like a stored value card, but solely for the purchase of fruits and vegetables. The second benefit 1822 provides a 30% discount on fruits and vegetables that are purchased after that first $30 benefit 1820 is used up in any given month. The discount benefit 1822 is further capped so that no household can receive more than an additional $20 in any month using benefit 1822. This means that if a household has spent $40 dollars on fruits and vegetables in a given month, the entire $30 stored value benefit 1820 would have been used, and an additional $3 from the 30% discount benefit 1822 would also be used. The household still would have $27 worth of discounts on fruits and vegetables available through benefit 1822.

At step 1738, the available enhanced SNAP benefits for the user (as identified in database 1692) are then applied to the basket of identifiers of purchased items 1608 received from the retail store system 1610. The server system 1670 calculates the discounts available on the purchased items 1608 and reports these discounts back to the terminal 1620. The terminal 1620 could then apply the discounts to the purchased items (step 1738). The server system 1670 would then update the enhanced SNAP database 1692 to reflect the provided discounts at step 1740.

After step 1740 is completed, the process flow for enhanced SNAP benefits processing 1682 moves to duplicate the normal SNAP card processing 1684 as represented by steps 1722-1728. Note that processing for enhanced SNAP benefits is shown in FIG. 17 by solid arrows, while processing for normal SNAP benefits is shown by dashed arrows. This means that the total amount of SNAP eligible purchases will be reported from the retail store system 1610 to the server system 1670 (step 1722), the server system will read the available benefits from the SNAP benefits database 1694 (step 1724), the server system 1670 will report the applied benefits to the retail store system 1610 for application by the terminal 1620 to the purchased items 1608 (step 1726), and the SNAP database will be updated to reflect the provided benefits (step 1728). Of course, the flow chart 1700 shown in FIG. 17 does not have to be implemented in a step-by-step fashion in the order presented in FIG. 17. In other words, the retail store system 1610 could present both the basket of purchased items (step 1732) and the total of SNAP eligible purchased (step 1722) at the same time, which would be the most logical way to implement this method 1700. In one embodiment, the basket of items received in step 1732 includes not only items eligible for enhanced SNAP benefits 1820, 1822, but also identifies all purchased items 1608 that are eligible for general SNAP benefits 1840. In this way, detailed product information is provided on all SNAP related purchases, which can be used to analyze eating habits under the SNAP program. In addition, the server system 1670 could calculate both the enhanced SNAP benefits 1820, 1822 and the normal SNAP benefits 1840, at the same time, an then report the total benefits applied to the purchased items 1608 to the retail store system 1610 in a single communication.

In this way, a user that presents the enhanced SNAP account identifier 166 will be able to access their normal SNAP benefits 1840 as well as the enhanced SNAP benefits 1820, 1822 by presenting only a single identifier 1606 to the account reader 1640. Furthermore, a user could have the ability to present either a normal SNAP Mag stripe card 1604 or present their enhanced SNAP number 1606 through a mobile device when the make a purchase a retail store system 1610. Either presentation 1604, 1606 will allow the user to access the same pool of SNAP benefits 1840, with the benefits being calculated, applied, and tracked in the same manner. If the user chooses to utilize the enhanced SNAP number 1606 presentation, they would also be able to access the enhanced SNAP benefits 1820, 1822. One benefit of this "dual redemption path" to the SNAP benefits shown in system 1600 and method 1700 is that the granting of enhanced SNAP benefits 1840 to beneficiaries can be implemented incrementally. Some states may implement enhanced SNAP benefits to SNAP beneficiaries residing in that state, and provide to the beneficiaries both a universal SNAP card 1604 and a mobile device (smart phone) app that could present the enhanced SNAP number 1606. The beneficiary can use the standard SNAP card 1604 when shopping at retailers that have not installed the appropriate reader 1646 or have not updated their controllers 1650 to provide a basket of purchase item identifiers filtered according to a PPF list 1652 to the server system 1670. Furthermore, the beneficiary can use the standard SNAP card 1604 when shopping in states that have not yet implemented enhanced SNAP benefits processing 1682. When available, however, the beneficiary can present the enhanced SNAP identifier 1606 to the retail store system 1610 and receive both standard SNAP benefits 1840 and the enhanced SNAP benefits 1820, 1822. Since both processes 1682, 1684 access and record transactions in the same SNAP benefits database 1694, there is no chance that the beneficiaries will be able to exceed their monthly standard SNAP benefit amounts 1840 when using both techniques.

In one embodiment, the enhanced SNAP processing 1682 is able to provide not only enhanced SNAP benefits 1820, 1822, and standard SNAP benefits 1840, but is also able to provide access to third-party-sponsored discounts 1800, 1802, 1804. This is accomplished in method 1700 by step 1734 identifying that the provided enhanced SNAP identifier 1606 is eligible for discount benefits processing 1680. If so, the method 1700 progresses to step 1714, where the available benefits 1800, 1802, 1804 for the identifier are determined, pre-requisites are analyzed to determine available discounts, the discounts are calculated for the purchased products identified in the filtered basket of product identifiers, the calculated discounts are returned to the terminal for the purchase transaction, and purchased items and used benefits are recorded in the discount benefits database 1690. In this way, a purchaser of products 1608 can present their identifier 1606 and be awarded discounts 1800, 1802, and 1804 (sponsored by third-parties), receive enhanced SNAP benefits 1820, 1822, and apply their normal SNAP benefits 1840 to the purchase transaction. By processing the benefits 1800, 1802, 1804, 1820, 1822, and 1840 in the order shown in FIG. 17, the third party sponsored discounts are applied first so that the government benefits are applied only to the discounted amounts. Furthermore, the more specific enhanced SNAP benefits 1820, 1822 are applied before the general SNAP benefit 1840, thereby ensuring that the most useful, least restrictive benefit 1840 is preserved as long as possible.

The system and methods described above are exemplary and are not the exclusive techniques for using the disclosed embodiments. Numerous modifications and variations will readily occur to those skilled in the art. Because such modifications are possible, the invention is not to be limited to the exact construction and operation illustrated and described. Rather, the present invention should be limited only by the following claims.

What is claimed is:

1. A method comprising:
   a) at a server system, defining in a computerized database:
      i) Supplemental Nutrition Assistance Program (SNAP) stored value benefits for a plurality of users,
      ii) enhanced SNAP benefits for the plurality of users, and
      iii) discount benefits;
   b) at the server system, receiving from a first point of sale system information concerning a first purchase transaction, the information comprising:
      a first filtered list of purchased items that were purchased during the first purchase transaction, the first filtered list of purchased items having been created in part by the first point of sale system by filtering items purchased during the first purchase transaction against a first promotion product filter (PPF) list,
      i) information identifying a first SNAP eligible purchase total indicating a total value of purchased SNAP eligible items in the first purchase transaction, wherein the SNAP eligible items consists of those items that are eligible for the SNAP stored value benefits, and
      ii) a first identifier associated with a first user;
   c) at the server system, determining discount benefits for the first purchase transaction by:
      i) identifying, in the computerized database, discount benefits available for the first user using the first identifier,
      ii) comparing the first filtered list of purchased items against the identified discount benefits to determine available discount benefits for the first purchase transaction, and
      iv) adjusting the discount benefits remaining for the first user;
   d) at the server system, determining enhanced SNAP benefits for the first purchase transaction by:
      i) identifying, in the computerized database, enhanced SNAP benefits available for the first user using the first identifier,
      ii) comparing the first filtered list of purchased items against the identified enhanced SNAP benefits to determine available enhanced SNAP benefits for the first purchase transaction, and
      iii) adjusting the enhanced SNAP benefits remaining for the first user;
   e) at the server system, determining SNAP stored value benefits for the first purchase transaction by:
      i) identifying, in the computerized database, SNAP stored value benefits for the first user, calculating a first SNAP discount for the first purchase transaction based on the identified SNAP stored value benefits and the first SNAP eligible purchase total, and
      i) adjusting the SNAP stored value benefits remaining for the first user;
   f) at the server system, receiving from a second point of sale system information concerning a second purchase transaction comprising:
      i) a second SNAP eligible purchase total, the second SNAP eligible purchase total indicating a total value of purchased SNAP eligible items in the second purchase transaction, and
      ii) a second identifier that is associated with the first user and is different from the first identifier; and
   g) at the server system, determining SNAP stored value benefits for the second purchase transaction by:
      i) identifying, in the computerized database, SNAP stored value benefits for the first user using the second identifier,
      ii) calculating a second SNAP discount for the second purchase transaction based on the identified SNAP stored value benefits and the second SNAP eligible purchase total, and
      iii) adjusting the SNAP stored value benefits remaining for the first user.

2. The method of claim 1, wherein step e) further comprises:
   iv) at the server system, reporting the available and calculated discounts to the first point of sale system for application to the first purchase transaction;
   and wherein step g) further comprises
   iv) at the server system, reporting the calculated discounts to the second point of sale system for application to the second purchase transaction.

3. The method of claim 1, wherein the first filtered list of purchased items further identifies a list of all SNAP eligible items purchased in the first purchase transaction, and further wherein the list of purchased SNAP eligible items is stored by the server system in the computerized database.

4. The method of claim 1, wherein the enhanced SNAP benefits comprise an additional stored value benefit on a subset of SNAP eligible items.

5. The method of claim 4, wherein the enhanced SNAP benefits apply to fresh fruits and vegetables.

6. The method of claim 4, wherein the enhanced SNAP benefits further comprise a percentage discount on the subset of SNAP eligible items that is provided after the additional stored value benefit has been consumed.

7. The method of claim 6, wherein the percentage discount is capped at a dollar amount.

8. The method of claim 1, further comprising a step of periodically transmitting the first PPF list from the server system to the first point of sale system.

9. The method of claim 8, further comprising a step of associating the first PPF list with a first program at the server system, and combining the first PPF list with a plurality of other PPF lists that are associated with a plurality of other programs at the server system, wherein the combined PPF list identifies which items are associated with each program, and then sending the combined PPF list from the server system to the first point of sale system, further wherein the first point of sale system identifies the items in the first PPF list by identifying items in the combined PPF list associated with the first program.

10. The method of claim 9, wherein each program is associated with a different state, and wherein each of the PPF lists indicate items eligible for the enhanced SNAP benefits in the different state programs, and wherein each PPF list is used for users receiving benefits from a single one of the different states, and further wherein the first identifier is used to identify the first program.

11. The method of claim 1, wherein the server system defines in the computerized database third-party sponsored benefits for the plurality of users, wherein the first filtered list of purchased items was created by the first point of sale system by further filtering all items purchased during the first purchase transaction against a list of items relating to the third-party sponsored benefits, and further wherein the server system determines third-party sponsored benefits for the first purchase transaction by comparing the first filtered list of purchased items to the third-party sponsored benefits available for the first user.

12. The method of claim 11, wherein third-party sponsored benefits for the first purchase transaction are determined first, wherein enhanced SNAP benefits are determined for the first purchase transaction after applying the third-party sponsored discounts, and wherein the SNAP stored value benefits are determined for the first purchase transaction after applying the enhanced SNAP benefits.

13. The method of claim 1, wherein enhanced SNAP benefits for the first purchase transaction are determined first, and wherein the SNAP stored value benefits are determined for the first purchase transaction after applying the enhanced SNAP benefits.

14. The method of claim 1, wherein the second point of sale system is located in a different state than the first point of sale system.

15. The method of claim 14, wherein the second point of sale system is incapable of generating a filtered list of purchased items.

16. The method of claim 1, further comprising reading the first identifier at the first point of sale system from a bar code presented on a mobile device screen, and reading the second identifier at the second point of sale system from a magnetic strip found on a card.

17. A method comprising:
a) at a server system, defining in a computerized database:
 i) Supplemental Nutrition Assistance Program (SNAP) stored value benefits for a plurality of users, and
 ii) enhanced SNAP benefits for the plurality of users;
b) at the server system, receiving from a first point of sale system information concerning a first purchase transaction, the information comprising:
 i) a first filtered list of purchased items that were purchased during the first purchase transaction, the first filtered list of purchased items having been created by the first point of sale system by filtering items purchased during the first purchase transaction against a first promotion product filter (PPF) list,
 ii) a first SNAP eligible purchase total, the first SNAP eligible purchase total indicating a total value of purchased SNAP eligible items in the first purchase transaction, wherein the SNAP eligible items consists of those items that are eligible for the SNAP stored value benefits, and
 iii) a first identifier associated with a first user;
c) at the server system, determining enhanced SNAP benefits for the first purchase transaction by:
 i) identifying, in the computerized database, the enhanced SNAP benefits available for the first user using the first identifier,
 ii) comparing the first filtered list of purchased items against the identified enhanced SNAP benefits to determine available enhanced SNAP benefits for the first purchase transaction, and
 iii) adjusting the enhanced SNAP benefits remaining for the first user;
d) at the server system, determining SNAP stored value benefits for the first purchase transaction by:
 i) identifying, in the computerized database, the SNAP stored value benefits for the first user, calculating a first SNAP discount for the first purchase transaction based on the identified SNAP stored value benefits and the first SNAP eligible purchase total, and
 ii) adjusting the SNAP stored value benefits remaining for the first user;
e) at the server system, receiving from a second point of sale system information concerning a second purchase transaction comprising:
 i) a second SNAP eligible purchase total, the second SNAP eligible purchase total indicating a total value of purchased SNAP eligible items in the second purchase transaction, and
 ii) a second identifier that is associated with the first user and is different from the first identifier; and
f) at the server system, determining SNAP stored value benefits for the second purchase transaction by:
 i) identifying, in the computerized database, the SNAP stored value benefits for the first user using the second identifier,
 ii) calculating a second SNAP discount for the second purchase transaction based on the identified SNAP stored value benefits and the second SNAP eligible purchase total, and
 iii) adjusting the SNAP stored value benefits remaining for the first user.

18. The method of claim 17, wherein the second point of sale system is located in a different state than the first point of sale system and wherein the second point of sale system does not have a PPF list indicating items eligible for the enhanced SNAP benefits.

19. The method of claim 17, further comprising reading the first identifier at the first point of sale system from a bar code presented on a mobile device screen, and reading the second identifier at the second point of sale system from a magnetic strip found on a card.

20. A method using a computerized database storing Supplemental Nutrition Assistance Program (SNAP) stored value benefits for a plurality of users and enhanced SNAP benefits for the plurality of users, the method comprising:
a) at a server system, receiving from a first point of sale system information concerning a first purchase transaction, the information comprising:
 i) a list of purchased items that are eligible for the enhanced SNAP benefits,
 ii) a first SNAP eligible purchase total, and
 iii) a first identifier associated with a first user;
b) at the server system, determining enhanced SNAP benefits for the first purchase transaction by:
 i) identifying, in the computerized database, the enhanced SNAP benefits available for the first user using the first identifier,
 ii) comparing the list of purchased items that are eligible for the enhanced SNAP benefits against the identified enhanced SNAP benefits to determine available enhanced SNAP benefits for the first purchase transaction,
   iii) calculating an enhanced SNAP discount for the first purchase transaction, and
   iv) adjusting the enhanced SNAP benefits remaining for the first user;
c) at the server system, determining SNAP stored value benefits for the first purchase transaction by:
   i) identifying, in the computerized database, the SNAP stored value benefits for the first user, calculating a first SNAP discount for the first purchase transaction based on the identified SNAP stored value benefits and the first SNAP eligible purchase total, and
   i) adjusting the SNAP stored value benefits remaining for the first user;
d) at the server system, receiving from a second point of sale system information concerning a second purchase transaction comprising:
   i) a second SNAP eligible purchase total, and
   ii) a second identifier that is associated with the first user and is different from the first identifier; and
e) at the server system, determining SNAP stored value benefits for the second purchase transaction by:
   i) identifying, in the computerized database, the SNAP stored value benefits for the first user after the first purchase transaction,
   ii) calculating a second SNAP discount for the second purchase transaction, and
   iii) adjusting the SNAP stored value benefits remaining for the first user.

\* \* \* \* \*